US010404943B1

(12) United States Patent
Fieldman

(10) Patent No.: US 10,404,943 B1
(45) Date of Patent: Sep. 3, 2019

(54) BANDWIDTH REDUCTION IN VIDEO CONFERENCE GROUP SESSIONS

(71) Applicant: Study Social, Inc., Gainesville, FL (US)

(72) Inventor: Ethan Fieldman, Gainesville, FL (US)

(73) Assignee: STUDY SOCIAL, INC., Gainesville, FL (US)

( * ) Notice: Subject to any disclaimer, the term of this patent is extended or adjusted under 35 U.S.C. 154(b) by 0 days.

(21) Appl. No.: 16/198,414

(22) Filed: Nov. 21, 2018

Related U.S. Application Data

(60) Provisional application No. 62/589,047, filed on Nov. 21, 2017.

(51) Int. Cl.
| | | |
|---|---|---|
| G06F 15/16 | (2006.01) | |
| H04N 7/15 | (2006.01) | |
| H04N 7/14 | (2006.01) | |
| H04L 29/06 | (2006.01) | |
| H04L 29/08 | (2006.01) | |
| G09B 7/00 | (2006.01) | |

(52) U.S. Cl.
CPC ........... *H04N 7/15* (2013.01); *H04L 65/1069* (2013.01); *H04L 65/403* (2013.01); *H04L 65/608* (2013.01); *H04L 67/104* (2013.01); *H04N 7/147* (2013.01); *G09B 7/00* (2013.01)

(58) Field of Classification Search
CPC . G09B 7/00; H04N 7/15; H04N 7/147; H04L 65/1069; H04L 65/403; H04L 65/608; H04L 67/104
USPC ......................................................... 709/204
See application file for complete search history.

(56) References Cited

U.S. PATENT DOCUMENTS

| | | |
|---|---|---|
| 6,807,566 B1 | 10/2004 | Bates |
| 7,509,382 B1 | 3/2009 | Jania |
| 7,827,054 B2 | 11/2010 | Campbell |
| 8,051,057 B2 | 11/2011 | Abu-Hakima |
| 8,230,015 B2 | 7/2012 | Suzuki |

(Continued)

OTHER PUBLICATIONS

Osborne; 2007; Have a text or picture message appear on NYC jumbotron; https://www.geek.com/mobile/have-a-text-or-picture-message-appear-on-nyc-jumbotron-572011/.

(Continued)

*Primary Examiner* — Alan S Chou
(74) *Attorney, Agent, or Firm* — Beyer Law Group LLP

(57) ABSTRACT

Any number of computers join a session of an online video conference facilitated by a server of a central computer. Each computer sends to the server participant metadata including a role for each computer (e.g., "tutor" or "student") and streaming information to facilitate streaming between other computers. The server sends the participant metadata to all other computers in the session. A computer decides to subscribe to a video stream of another computer only if that other computer has a role of "tutor." The tutor computer subscribes to video streams from all student computers. A peer-to-peer communication platform such as WebRTC facilitates communications between computers but does not pass any video or audio streams via the central computer. The tutor computer subscribes to students who are speaking. A student computer subscribes to a video stream from another student computer if the download and upload speeds respectively are above a certain threshold.

30 Claims, 19 Drawing Sheets

Online Social Education System

(56) References Cited

U.S. PATENT DOCUMENTS

| | | |
|---|---|---|
| 8,769,417 B1 | 7/2014 | Robinson |
| 9,641,356 B2 | 5/2017 | Hamilton |
| 9,686,222 B2 | 6/2017 | Carter |
| 2004/0147248 A1 | 7/2004 | Will |
| 2005/0191605 A1 | 9/2005 | Nguyen |
| 2007/0156824 A1 | 7/2007 | Thompson |
| 2009/0083637 A1 | 3/2009 | Skakkebaek |
| 2009/0202965 A1 | 8/2009 | Lee |
| 2010/0122163 A1 | 5/2010 | Goldberg |
| 2010/0151431 A1 | 6/2010 | Miller |
| 2011/0137811 A1 | 6/2011 | Patel |
| 2011/0153747 A1 | 6/2011 | Will |
| 2011/0246658 A1* | 10/2011 | Dettori ............... H04L 67/1008 709/231 |
| 2011/0302506 A1 | 12/2011 | Noyes |
| 2012/0107787 A1 | 5/2012 | Zimmerman |
| 2012/0209933 A1* | 8/2012 | Ridges ................. H04L 65/403 709/208 |
| 2012/0210252 A1 | 8/2012 | Fedoseyeva |
| 2012/0231441 A1 | 9/2012 | Parthasarathy |
| 2012/0244506 A1 | 9/2012 | Lang |
| 2012/0254773 A1 | 10/2012 | Viswanathan |
| 2012/0264099 A1 | 10/2012 | Craft, IV |
| 2012/0297306 A1* | 11/2012 | Hassan ................ H04W 76/14 715/735 |
| 2012/0315616 A1 | 12/2012 | Fourman |
| 2013/0183647 A1 | 7/2013 | Miller |
| 2013/0290433 A1 | 10/2013 | Park |
| 2013/0307920 A1 | 11/2013 | Cahill |
| 2014/0162239 A1 | 6/2014 | Roach |
| 2014/0173638 A1 | 6/2014 | Anderson |
| 2014/0199675 A1 | 7/2014 | Zajfman |
| 2014/0220536 A1 | 8/2014 | Dow |
| 2014/0234824 A1 | 8/2014 | Schepman |
| 2014/0297876 A1 | 10/2014 | Aquilina |
| 2014/0321834 A1 | 10/2014 | Segal |
| 2015/0170529 A1 | 6/2015 | Hafeez |
| 2015/0181165 A1* | 6/2015 | Iltus ....................... H04N 7/15 348/14.09 |
| 2016/0072862 A1* | 3/2016 | Bader-Natal ............ H04N 7/15 715/755 |
| 2016/0085381 A1 | 3/2016 | Parker |
| 2016/0112483 A1* | 4/2016 | Tash ................... H04L 67/1044 709/224 |
| 2016/0148522 A1 | 5/2016 | Rowland |
| 2016/0165184 A1* | 6/2016 | Aaron ...................... H04N 7/15 348/14.08 |
| 2016/0253912 A1 | 9/2016 | Heilman |
| 2017/0046659 A1* | 2/2017 | Inomata .............. H04L 12/1818 |
| 2017/0181205 A1* | 6/2017 | Hegde ................. H04W 12/06 |
| 2017/0279860 A1* | 9/2017 | Agarwal ............... H04L 65/403 |

OTHER PUBLICATIONS

Patterson; "How to send a photo from your iPhone directly to Facebook (updated)"; Oct 31, 2011; http://heresthethingblog.com/2011/10/31/send-photo-iphone-facebook!.

* cited by examiner

BANDWIDTH REDUCTION IN VIDEO CONFERENCE GROUP SESSIONS

CROSS-REFERENCE TO RELATED APPLICATIONS

This application claims priority of U.S. provisional patent application No. 62/589,047, filed Nov. 21, 2017, entitled "GROUP SESSIONS FEATURE," which is hereby incorporated by reference.

This application is related to U.S. Pat. No. 10,126,927 entitled "COLLABORATIVE, SOCIAL, ONLINE EDUCATION AND WHITEBOARD TECHNIQUES," filed Mar. 9, 2015, which is hereby incorporated by reference.

FIELD OF THE INVENTION

The present invention relates generally to video conferencing. More specifically, the present invention relates to limiting video and audio streams between participants in a video conference in order to reduce bandwidth required.

BACKGROUND OF THE INVENTION

With computers and similar devices now becoming nearly ubiquitous, it is now more common for individuals to communicate with one another, hold meetings, study together, etc., using video conferencing or video chat capabilities of their computers. A video conference can be more convenient for the participants, less expensive and easier to arrange, especially when the participants are located remotely from one another. Common online video conference services include Skype, Google Hangouts, Facebook Messenger, Zoom, WebEx, etc.

Typically, in a video conference all participants will be able to see and hear all of the other participants; that is, the computer of a single participant will display a live video stream of the other participants as well as playing the audio stream from each one. In a conference of, say, four participants, each participant computer must download three video and three audio streams, as well as uploading three video and three audio streams of the participant himself, resulting in a total of twenty-four video streams and twenty-four audio streams being uploaded and downloaded to and from all the participant computers. The bandwidth consumed by all of these streams creates a number of problems for the participant computers.

Even adding a single participant to a group of four means adding sixteen new video and audio streams for total of forty streams. The increase in bandwidth required can slow down participant's computers, freeze video streams, etc., because a particular Internet connection may not have enough bandwidth to accommodate all of the streams. Further, all of these streams also causes network congestion, especially in places like libraries in schools, causes latency or missed packets (i.e., only hearing every other word or seeing every few actions), causes other background applications to fail, strains shared Wi-Fi networks, etc.

Although some locations may have sufficient bandwidth, in many situations there is limited bandwidth. For example, mobile devices such as telephones or tablet computers may only have a data plan with limited bandwidth, or, because they are mobile, they may be moved to a location where coverage is worse and bandwidth may drop automatically. Many schools, colleges and universities, while technically having large bandwidth, may not have the correct infrastructure or architecture to handle the increase in bandwidth required by video conferences. Further, outside of the United States it can be common for bandwidth to be more limited or expensive. For all these reasons, it is desirable to limit bandwidth usage during a video conference.

Although it is possible for a participant to mute his or her video or audio stream (so that the stream is not uploaded to the other participant's computers), or to mute the video or audio stream from other participants being displayed on his or her computer (so that those streams do not have to be downloaded to his or her computer), this approach is not optimal because with multiple participants it becomes unwieldy to do so. And, muting is usually one directional, that is, a host cannot mute the video of one participant and still see it himself. Further, the additional administrative effort on the host computer is substantial and the system must add multiple extra buttons for mute/unmute, audio vs. video, etc. These extra buttons will clog the user interface and still have the above problems.

Other prior art techniques attempt to identify a participant who is speaking and then prioritize that video stream using a centralized computer. These techniques require that the central computer take in all video streams in order to choose which stream to show to the participants. Such centralized techniques require higher hardware and software costs, increased bandwidth to and from the central computer, and increased latency between participant computers.

U.S. Pat. No. 10,027,725 requires a central server to control all streams and to decide which stream to send to all participants. U.S. Pat. No. 6,775,247 also requires a central multimedia conference unit in order to determine who is the dominant caller. U.S. Pat. No. 9,712,570 limits bandwidth by disabling video streams by monitoring a maximum bandwidth value. U.S. Pat. No. 8,797,377 discloses background information. U.S. Pat. No. 8,593,504 discloses bandwidth throttling.

Accordingly, improved techniques and systems are desired to allow participants to hold video conferences online where bandwidth is limited.

SUMMARY OF THE INVENTION

To achieve the foregoing, and in accordance with the purpose of the present invention, improvements are disclosed that automatically reduce bandwidth during a group session of a video conference.

One advantage of the present invention is that it uses a peer-to-peer communication platform in order to display video streams and play audio streams to participants in an online video conference. A peer-to-peer communication platform has a number of advantages over a centralized system that requires video streams be uploaded to a central server, or requires that a central server controls the communication, including: fewer points of failure; no cost for the central hardware and software needed to process video streams or control communications; no bandwidth required to upload and download video streams to and from a central server, and no extra cost for this bandwidth; significantly less latency in communications between participants as a video stream does not need to be uploaded to a remote central server before being downloaded again to the other participant; and less security impositions due to not having to secure the data at rest (it is never stored). Other advantages include the software provider not paying for the actual bandwidth, as all bandwidth costs are borne by the users themselves, as well as fewer restrictions on traffic (because it is a peer-to-peer connection, it is harder to identify and block a service, as opposed to a centralized service where a single DNS can be identified and blocked or throttled).

Using a suitable peer-to-peer communication platform (such as WebRTC) video and audio streams will only be sent to another participant computer if that other participant computer subscribes to the computer producing the video and audio streams. Based upon a role of each participant, each computer can decide whether or not to subscribe to a video stream from that participant.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, embodiments of the present invention allow direct streaming of video and audio between participants (such as between students and tutors) and reduces dramatically the amount of bandwidth required for each such student or tutor computer. The video and audio streams need not pass through any central server (such as server computer 20) while being streamed between participants, although such a central computer may be used for other functions such as recording streams. Any suitable peer-to-peer communication platform may be used and will typically include a server on a server computer to facilitate the communications. For example, WebRTC may be used and will include such a server. This server is used at the beginning of a video conference in order to signal to the participants who are the other participants; once signaled, the participants then communicate peer-to-peer without a need for a central server as will be described in more detail below.

Online Social Education System Overview

Figure 1:
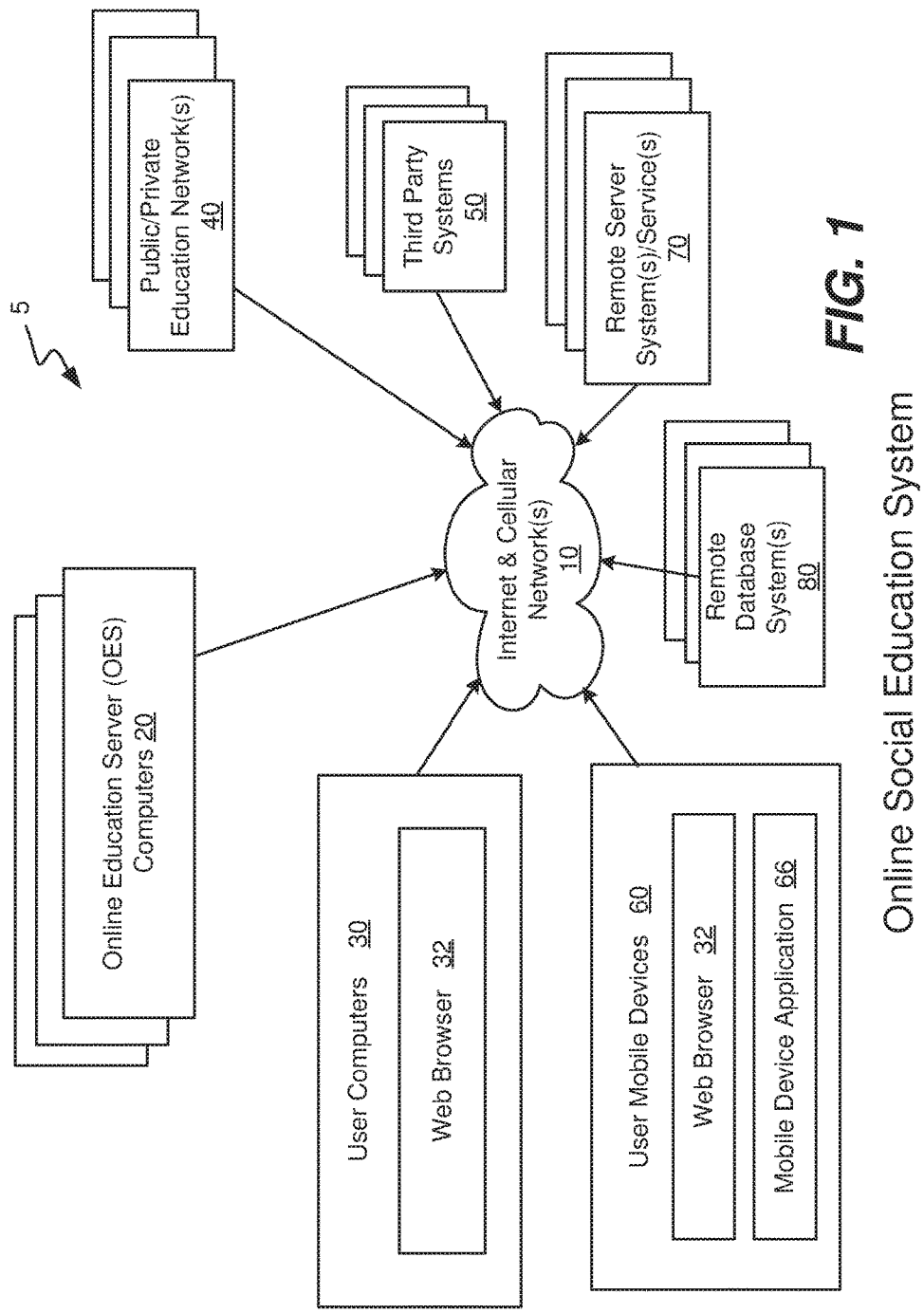
FIG. 1 is a block diagram of an Online Social Education System (OSES), which may be implemented via a computerized data network.

FIG. 1 is a block diagram of an Online Social Education System (OSES) 5, which may be implemented via a computerized data network. More specifically, the techniques described herein utilize technology to construct and implement an online learning system for students, tutors, instructors, teachers and parents. These techniques foster a dynamic, online education environment via social interaction which is non-linear, hands-on, effective and fun.

The Online Social Education System 5 includes any number of education server computers 20 that help to implement the inventive embodiments described below. Public or private education networks 40 include, for example, student information systems (SIS), student data management networks, etc. Third-party systems 50 include computers and software for social networks (e.g., Facebook, Twitter, Google, etc.) and online video conferencing and Web seminars (e.g., WebEx, Adobe Connect, Skype, etc.). Remote server systems and services 70 include content provider servers and services such as media streaming, database storage and access, financial transactions, payment gateways, electronic commerce, event management, etc. Remote database systems 80 provide access to any remote database.

User computers 30 include any number of computers used by participants, students, teachers, tutors, etc., and include personal computers (PCs), desktop computers, laptop computers, tablet computers, set-top boxes (STB), personal digital assistants (PDAs), etc., and typically each will include a Web browser 32 to access the World Wide Web via a network. User mobile devices 60 are any number of mobile telephones, smartphones, tablet computers, or similar devices used to communicate voice and data over a cellular network, and may also include a Web browser 62 and any number of software applications 66 (or "apps") used to perform functions on the device and over the network. Internet and cellular networks 10 include the Internet and cellular networks over which the above devices and systems communicate.

Online Education Server Computer

Figure 2:
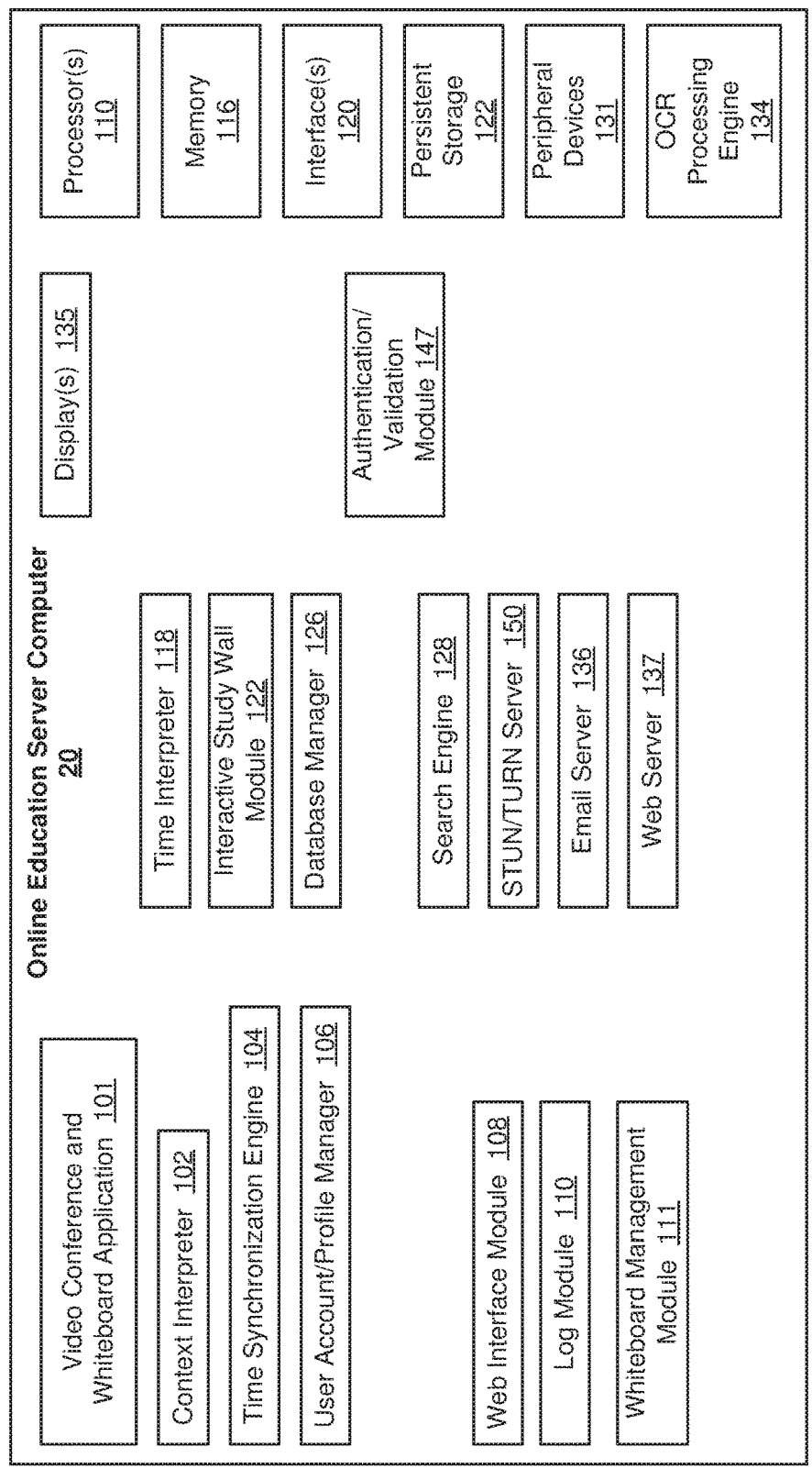
FIG. 2 is a block diagram of an online education server computer that includes a number of software modules, servers and hardware as described below.

FIG. 2 is a block diagram of an online education server computer 20 that includes a number of software modules, servers and hardware as described below.

Included is a STUN or TURN server 150 (or both) for facilitating communication between user computers 30 and user mobile devices 60. Server 150 is used to signal to participant computers as to who is in a video conference, their IP addresses, etc. Session Traversal Utilities for NAT (STUN) is a set of methods and a protocol for traversal of NA gateways in real-time voice, video, messaging and other applications. STUN allows hosts to communicate and is used by other protocols such as Interactive Connectivity Establishment (ICE), the Session Initiation Protocol (SIP), or WebRTC. The protocol uses a third-party network server (STUN server) located on the public side of the NAT, usually the public Internet.

Traversal Using Relays around NAT (TURN) is a protocol that also assists in traversal NATs or firewalls for voice, video and messaging applications. Traversal Using Relay NAT (TURN) is a protocol that allows a client to obtain IP addresses and ports from relay that relays data through a server that resides on the public Internet. Although TURN almost always provides connectivity to a client, it is resource intensive for the provider of the TURN server. It is desirable to other mechanisms (such as STUN or direct connectivity) before using a TURN server. Interactive Connectivity Establishment (ICE) methodology may be used to find the optimal connectivity means.

Typically, two WebRTC clients communicate with each other using ICE. ICE allows WebRTC to find the best path to connect peer computers. It may be able to do that with a direct connection between the clients, but also works for clients where a direct connection is not possible (i.e., behind NATs). In the case of asymmetric NAT, ICE uses STUN server 150. In most cases, a STUN server is only used during the connection setup and once that session has been established, media will flow directly between clients. If a STUN server cannot establish the connection, ICE uses TURN. A TURN server is often used in the case of a symmetric NAT. Unlike STUN, a TURN server remains in the media path after the connection has been established. Thus, it is not typically used unless data is ever to be stored or recorded.

Server computer 20 includes a video conference and whiteboard application 101 that implements the GoBoard video conference service which is combined with an online, shared, electronic whiteboard. U.S. Pat. No. 10,126,927 referenced above, "Collaborative, Social, Online Education and Whiteboard Techniques," describes this video conference and an electronic whiteboard application in greater detail, and is hereby incorporated by reference.

Server computer 20 also includes a context interpreter 102 which analyzes contextual criteria relating to a detected event or condition and automatically determines a contextually-appropriate response. Examples of contextual criteria include: location-based criteria of a client or agent device; time-based criteria; identity of user; user profile information; transaction history information; recent user activities; and location-based business-related criteria. A time synchronization engine 104 manages universal time synchronization via NTP or GPS. Time interpreter 118 may modify or change identifier activation and expiration times based on various criteria such as time, location, transaction status, etc. User account or user profile manager 106 stores user information in a suitable database of server computer 20. Web Interface module 108 manages communications and transactions with a Web portal of the OES computer 20. Log module 110 generates and manages transactions, history logs, system errors, connections from APIs, etc. Whiteboard management module 111 implements various types of electronic whiteboard functions used by module 122. Interactive study wall module 122 implements functions related to an online, shared, electronic study wall used by students, tutors and teachers.

Database manager 126 handles various tasks relating to database updating, database management, database access, etc. A search engine 128 searches for transactions, logs, items, accounts, etc., in the various databases. Electronic mail server 136 provides various functions relating to e-mail activities and communications. Web server 137 provides various functions relating to Web server activities and communications.

Authentication/validation module 147 performs various types of authentication/validation tasks such as authenticating devices and users, verifying passwords, SSL certificates, biometric identification information, or other security-related information, verifying activation or expiration times, etc. Module 147 may authenticate the identity of the current user or client computer. For example, the current user may be required to perform a login process at their computer or mobile device in order to access functionality of the OES computer 20. OCR processing engine 134 performs optical character recognition of images such as those captured by a mobile device camera or camera of a computer.

Server computer 20 itself includes at least one processor 110, memory 116 (such as volatile memory or RAM), interfaces 118 which include wired interfaces or wireless interfaces, persistent storage 122 (such as hard disks, non-volatile memory, unalterable memory, flash drives, optical storage, etc.), peripheral devices 131 and one or more displays 135.

High Level Flow Diagram

Figure 3:
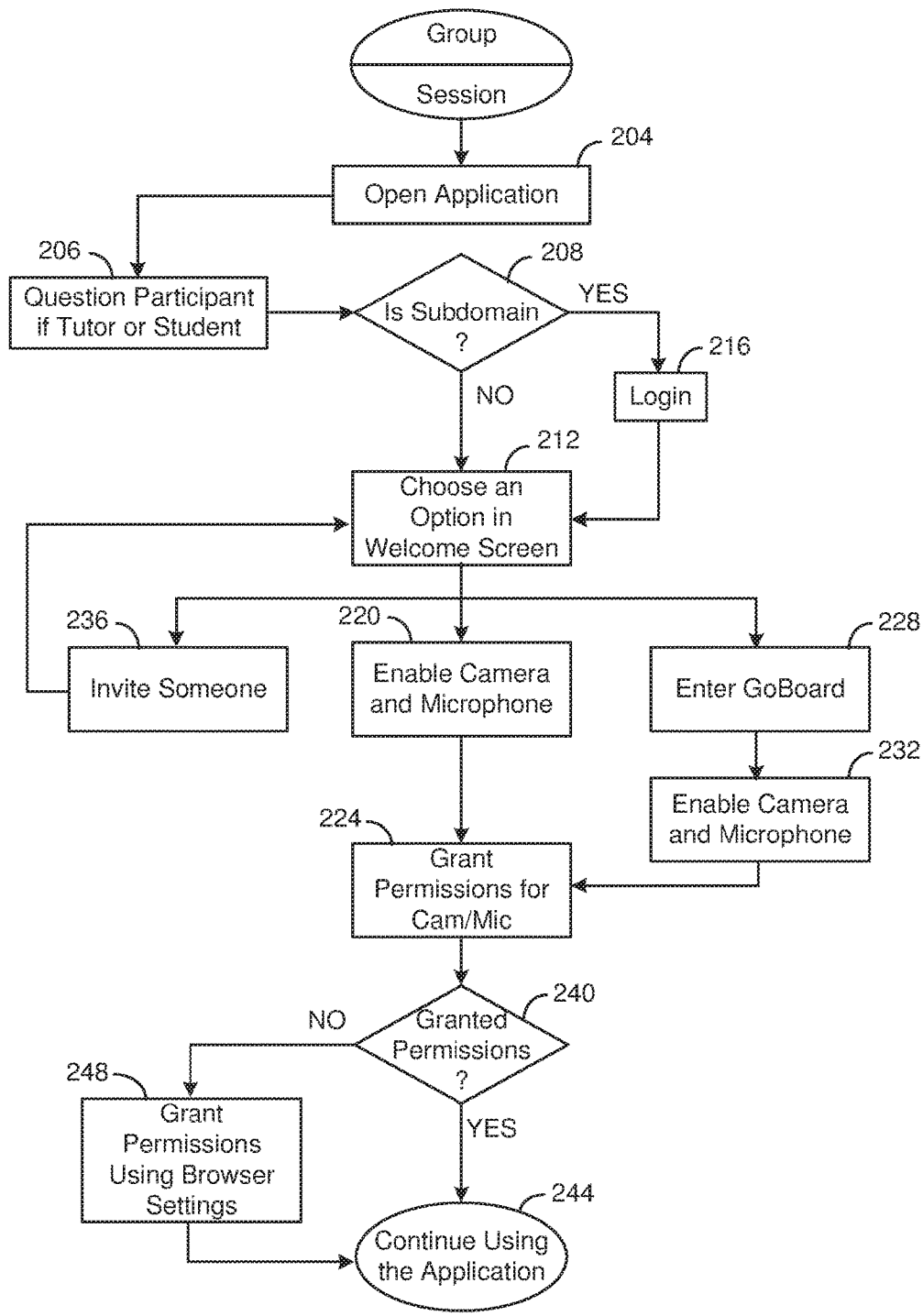
FIG. 3 is a flow diagram describing one embodiment by which a group session is held between multiple participants taking part in a video conference.

FIG. 3 is a flow diagram describing one embodiment by which a group session is held between multiple participants taking part in a video conference. The participants may be using any suitable video conferencing software or service in order to hold the group session. The present invention may be used with suitable video conferencing services such as Skype, Adobe Connect, Google Hangouts, Facebook Messenger, Zoom, WebEx, etc. Steps of FIG. 3 may be implemented using the video conferencing and electronic whiteboard application 101 as well as software on the participant's computing device (as applicable).

In one particular embodiment, the present invention is used in conjunction with the GoBoard online service, which combines video conferencing with an online, shared, electronic whiteboard. Access to GoBoard is via the link www.goboard.com and requires no downloading of software. The GoBoard video conference and whiteboard runs on two different platforms: a desktop version available via the Internet from a computer browser and an application on a tablet computer, both of which access the video conference and electronic whiteboard application 101. The U.S. patent referenced above, "Collaborative, Social, Online Education and Whiteboard Techniques," describes this video conference and an electronic whiteboard in greater detail, and is hereby incorporated by reference. GoBoard works best with an iPad tablet computer and an Apple digital pen. If using a desktop computer with a Web camera and microphone, the Wacom/Bamboo tablet computer works well. A Google Chrome browser is best (if on a desktop computer) along with at least 5 Mbps internet download speed. The following figures show the present invention being used with the GoBoard online service, although use of the invention with a shared electronic whiteboard in general, and with GoBoard in particular is not required.

In a first step 204 a participant (e.g., a tutor or a student) opens the video conferencing application using his or her computer, tablet or mobile device. Using GoBoard as an example, a student using a computer goes to the Web site https://goboard.com or may click on the GoBoard application on their tablet computer or mobile telephone. Either approach opens a link from the student computer to application 101 on server computer 20. If using another video conference service the participant opens that service as appropriate.

In one embodiment, each participant computing device implements WebRTC which is a real-time browser-based peer-to-peer communication platform for sharing video streams and audio streams between participant computers. Other similar peer-to-peer communication platforms may also be used such as Skype and Facetime.

Figure 4:
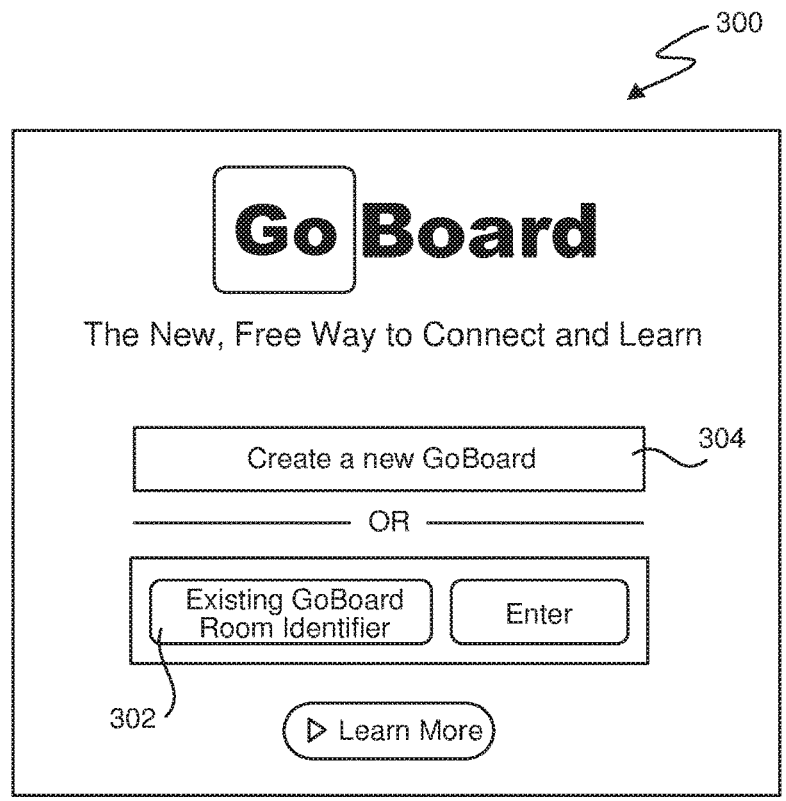
FIG. 4 illustrates the GoBoard landing page that appears once the participant has opened the application.

FIG. 4 illustrates the GoBoard landing page that appears once the participant has opened the application in step 204. A participant may enter an existing GoBoard room identifier at 302 in order to view an existing session (i.e., a session that has already been started by another participant) or may click upon button 304 in order to start a new session in which the participant will be the first one to join.

Figure 5:
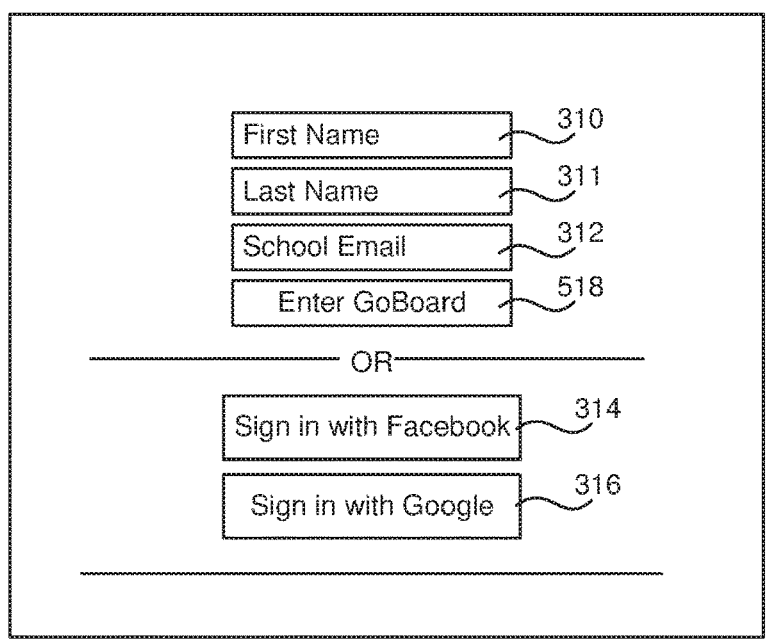
FIG. 5 illustrates a login page presented to the participant.
Figure 6:
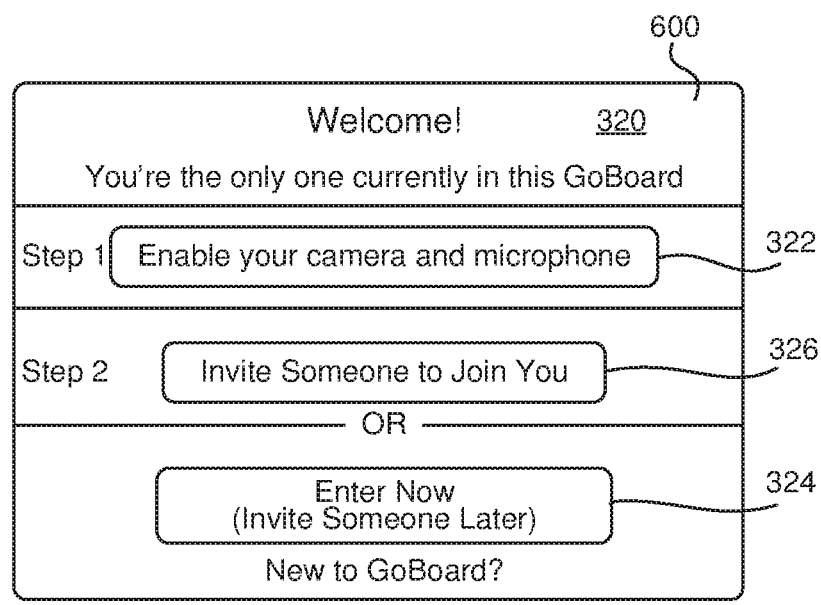
FIG. 6 shows a welcome screen on the participant's computing device that provides three options.

In a next step 206 the participant is presented with a question as to whether the participant is a student or a tutor (or other instructor, teacher, etc.). This question may be presented in any form using a similar interface as shown in FIGS. 4-6. In order to reduce the bandwidth of a video conference, application 101 may limit the video streams that are uploaded or downloaded depending upon whether a participant is a student or a tutor in a particular session. In one embodiment, each session may only have one tutor present in the session and that tutor's video stream may always be displayed to all students, while student video streams may not be displayed to all other students. A person who will lead the group session may also be considered a tutor, and may be any person who leads, directs or instructs during the group session.

Application 101 may keep track of whether a participant is a student or tutor in a user account (or user profile) database managed by profile manager 106. The user account database may keep track of information such as the user name, e-mail address of the user, school, a user PIN, birth date, telephone number, biographic information, geolocation information, IP address of current computing device being used, user security questions, etc. If a particular user is a tutor, the database may also keep track of information such as availability, any certifications, expertise in particular subjects, a rating, course codes for courses taught, etc.

In another embodiment, step 206 may not be necessary if application 101 can cross-reference the participant's name in the user account database using information from the login step 216. If identifying information from this login step can be used to identify a particular user account, and that account does indicate whether or not the user is a student or tutor, then step 206 may not be necessary. Other ways to identify whether a participant is a student or tutor include using single sign-on from a trusted source (like a school's learning management system) or a trusted source (other vendor, school, integrated partner) authenticating themselves and passing a student/tutor role in the API response initiating the session.

In this other embodiment, the login step 216 is also performed after step 208 so that all participants do login so that their role can be determined. Or, the login step may occur in place of step 206, in which case all participants do log in and their role of student or tutor is determined via the login step. The role of each participant will be associated with the computing device used, such as by using a device identifier. Thus, the participant metadata (described below) which describes how to stream to a particular device, and which includes the device identifier, will include a particular role.

Optionally, a check is performed in step 208 by application 101 to determine whether the participant is accessing the application via a subdomain (such as "university.goboard.com," where "university" is the name of the student school) or simply via the domain "goboard.com." A unique URL may have been created for each educational institution thus providing any number of subdomains by which students and tutors can access the application. This subdomain allows the application to know that a student is at a particular school or university.

An educational institution may also choose to create room identifiers ahead of time for each student, e.g., "university-.goboard.com/abc123," where "abc123" is a student identification number to allow each student told a conference with a tutor (and others) and to save work within a single session. Or, an institution may create room identifiers for particular courses and allow students and tutors to join those sessions identified by those identifiers.

If the participant is accessing the application via a subdomain then in step 216 a login screen is presented. Preferably, participants accessing via a subdomain are required to login (using their name and school e-mail address, or by logging in using their Facebook, Google or other credentials). Steps 208 and 216 allow the application to customize the session for each participant.

FIG. 5 illustrates a login page presented to the participant in step 216 (and optionally after step 208) that requires participant data such as first and last name and e-mail address 310-312. A participant may also login by providing their Facebook credentials 314 or their Google credentials 316. Once a user name and password have been entered, the participant selects button 318 and control moves to step 212. If a subdomain had not been used then control moves directly to step 212 in which a welcome screen is presented to the participant. The login screen may also ask whether the participant is a student or tutor.

Preferably, every computer is asked for this information. The local user computer, based on this information, has code running in its browser that will determine which streams to open or not. FIG. 6 shows a welcome screen 320 on the participant's computing device that provides three options. This is the welcome screen for the current session previously identified at 302 or 304 in FIG. 4. A participant may click on 322 in order to enable the camera and microphone on his or her computer, may click on 324 in order to enter a session (indicated from the room identifier entered at 302 or a new session previously indicated at 304), or may click on 326 in order to invite another participant to join this session. Assuming the participant clicks on 322 in step 220 his or her computer provides the option to enable the camera and microphone.

Figure 7:
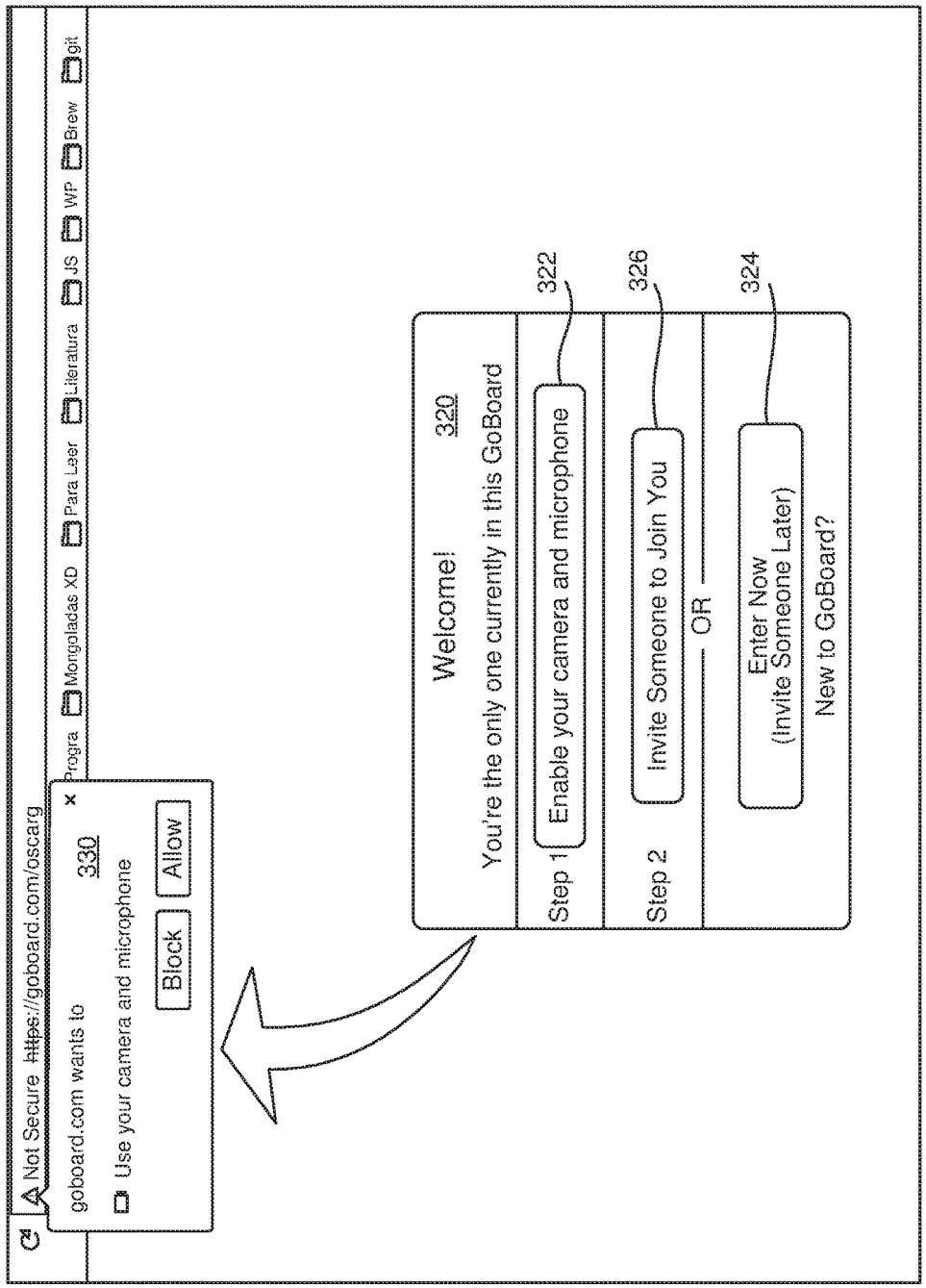
FIG. 7 shows a screen of the participant computer when the participant has chosen to enable his or her camera and microphone.

FIG. 7 shows a screen of the participant computer when the participant has chosen to enable his or her camera and microphone. A prompt window 330 appears giving the participant in step 224 the choice to enable his or her camera and microphone to be used by application 101. Once the permissions are granted in step 240 then in step 244 the participant continues using the application as will be described below. If the permissions are not granted explicitly by the user in step 240, then in step 248 the permissions may be granted using browser settings. For example, there are buttons (once the user is logged in) that toggle the use of microphone or camera on the left-hand side of the video box. These can be toggled by the user at any time during the session.

Figure 8:
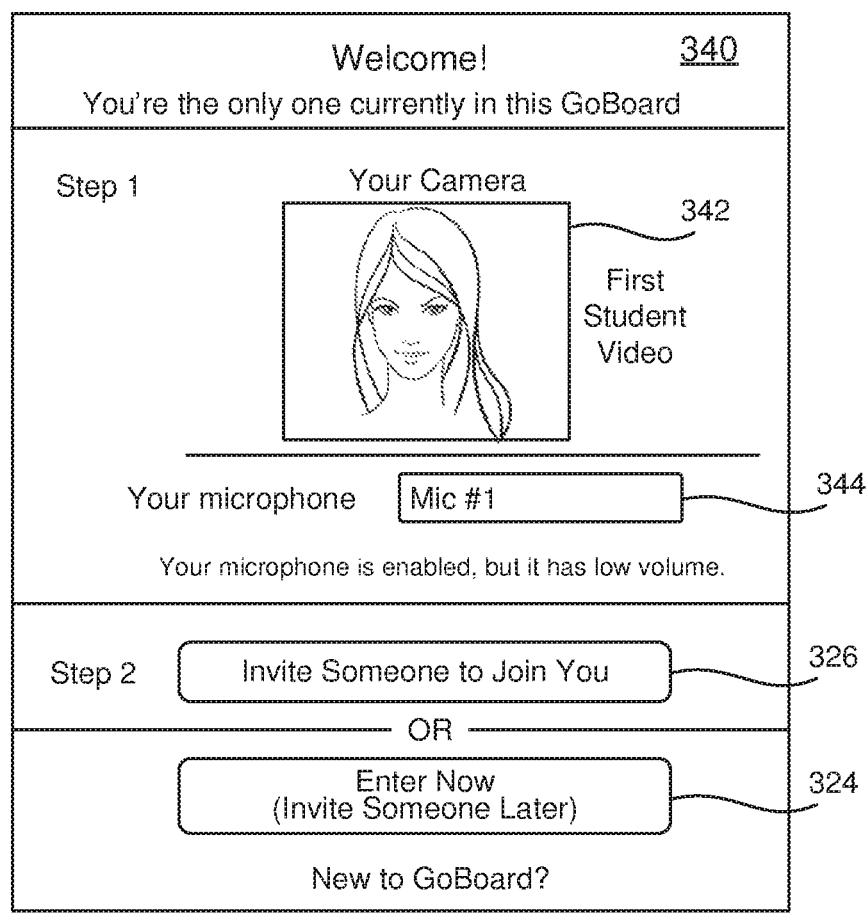
FIG. 8 illustrates a new version of the welcome screen presented to the participant after he or she has enabled his camera and microphone.

FIG. 8 illustrates a new version of the welcome screen 340 presented to the participant after he or she has enabled his camera and microphone. Window 342 displays a live video image of the participant taken using the camera on his or her computer; microphone 344 indicates which particular microphone is enabled on the participant computer; and, buttons 324 and 326 appear as before. The participant may now enter the current session 324 or invite another participant 326.

Once a participant has enabled his camera and microphone this state information will be stored on the participant computer, be sent to the computers of all other participants, and may also be sent to application 101 on server computer 20. This state information is stored by the browser (Google Chrome or Firefox, for example) in local storage, typically a local cache on the user's computer that the browser can read. Information such as the status of each user's camera and microphone, as well as their role, is stored here. Additional information like name, e-mail address, IP address, and network connection information may also be stored in this location.

Returning now to step 228, from the welcome screen 320 or 340 the participant may choose option 324 in order to immediately enter the session identified earlier in FIG. 4. Once this option is chosen, application 101 creates the online, shared electronic whiteboard, provides it with a URL (such as "https://goboard.com/abc123") and displays it on the participant screen. Video conferencing capability using a suitable peer-to-peer communication platform will also be enabled on the participant computer.

In conjunction with step 212 (or at any time after once a participant's role has been determined, but before the participant joins a group session) information concerning this student and his or her computer is sent from the computer to the STUN server 150 in server computer 20. This information, termed "participant metadata," includes the role of the participant (i.e., student or tutor), and stream information such as network parameters, etc., that will allow other computers to establish video and audio streams with the student's computer. The STUN server receives comprehensive network information for each connection between the peer devices including network address, port, network routing information and timestamp of last successful connection. It stores this data in a local database or file-based cache storage. Some may also be stored in memory (RAM).

A typical server 150 stores such participant metadata in a memory cache for later distribution to other participants. In the present invention, the role of server 150 is general participant tracking and identification of participants. Server 150 does not send or receive video or audio streams to or from participants; it simply informs all participants which other participants are in the current session. Thus, server 150 uses very little bandwidth.

Figure 9:
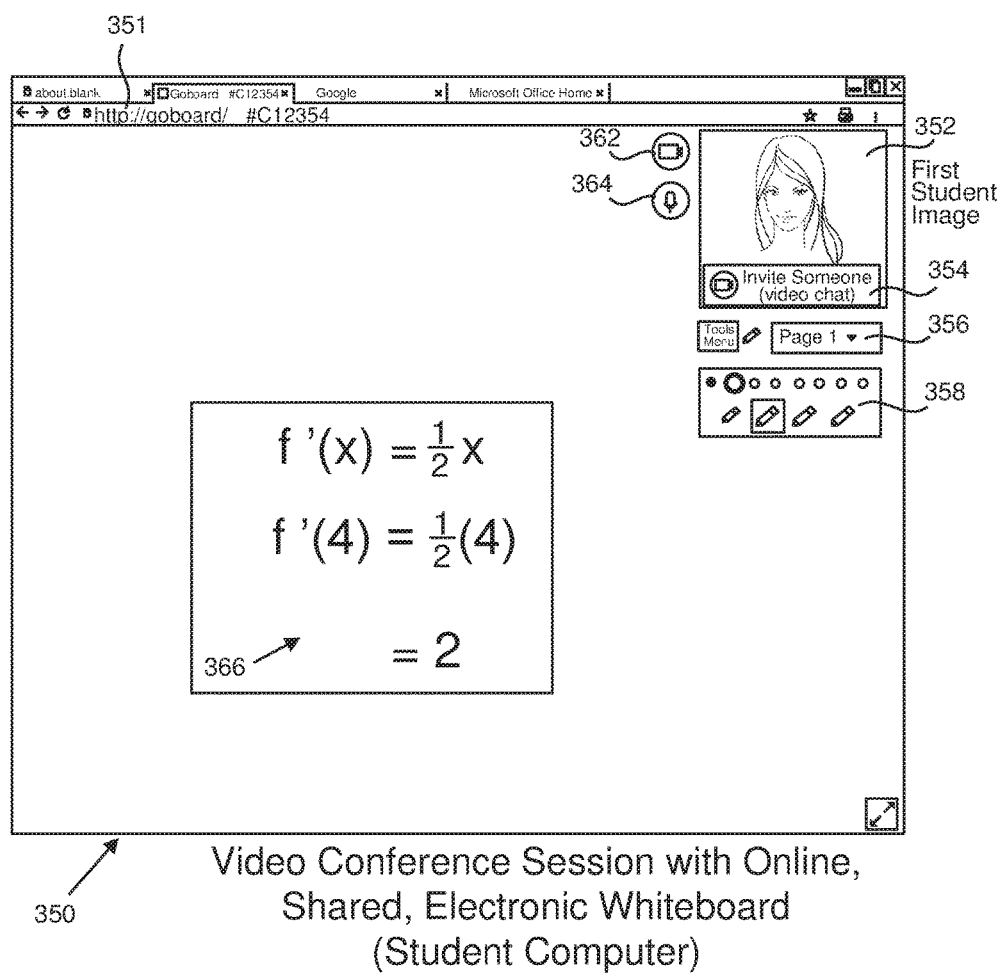
FIG. 9 illustrates one view of a session of the video conference with an online, shared electronic whiteboard displayed in the browser of the participant computer.

FIG. 9 illustrates one view 350 of a session of the video conference with an online, shared electronic whiteboard displayed in the browser of the participant computer. The Web site and unique room identifier are shown at 351. Shown is a still image 352 of the current and only participant, taken via the camera of his or her computer, an option 354 in order to invite another participant or tutor to the session, the ability 356 to move to different pages within the session, and a variety of control buttons 358 to draw on or otherwise manipulate the whiteboard within the session. Still image 352 of the first student may also be a live video image of the first student, but, such a video image does not increase bandwidth because the video is not streamed to any other computer.

Also shown at 366 is a formula that has been drawn by the current participant or by a former participant in the session. Buttons 362 and 364 are symbols representing a video camera and a microphone, respectively. In step 232 the current participant may enable his or her camera and microphone by clicking upon buttons 362 or 364 in which case the flow of steps 224-244 and of FIGS. 7 and 8 will be repeated for the current participant.

Returning now to step 236, the current participant may click upon button 326 or 354 in order to invite another participant to the current session. Once clicked, the participant is again shown welcome screen 320 and may click upon button 326. A window opens and the participant is shown a link to the current session (e.g., "https://goboard.com/c13525"), the ability to automatically send an e-mail message to that person with the link, or the ability to log into Facebook in order to send that link via a Facebook message. Once the second participant receives the link they may enter that link within their browser, thus taking them directly to session 350, or may open the GoBoard application as described above beginning at step 204, thus being presented with FIG. 4 and ability to enter the room identifier in order to enter the session.

Flow Diagram—Invite Second Participant

Figure 10:
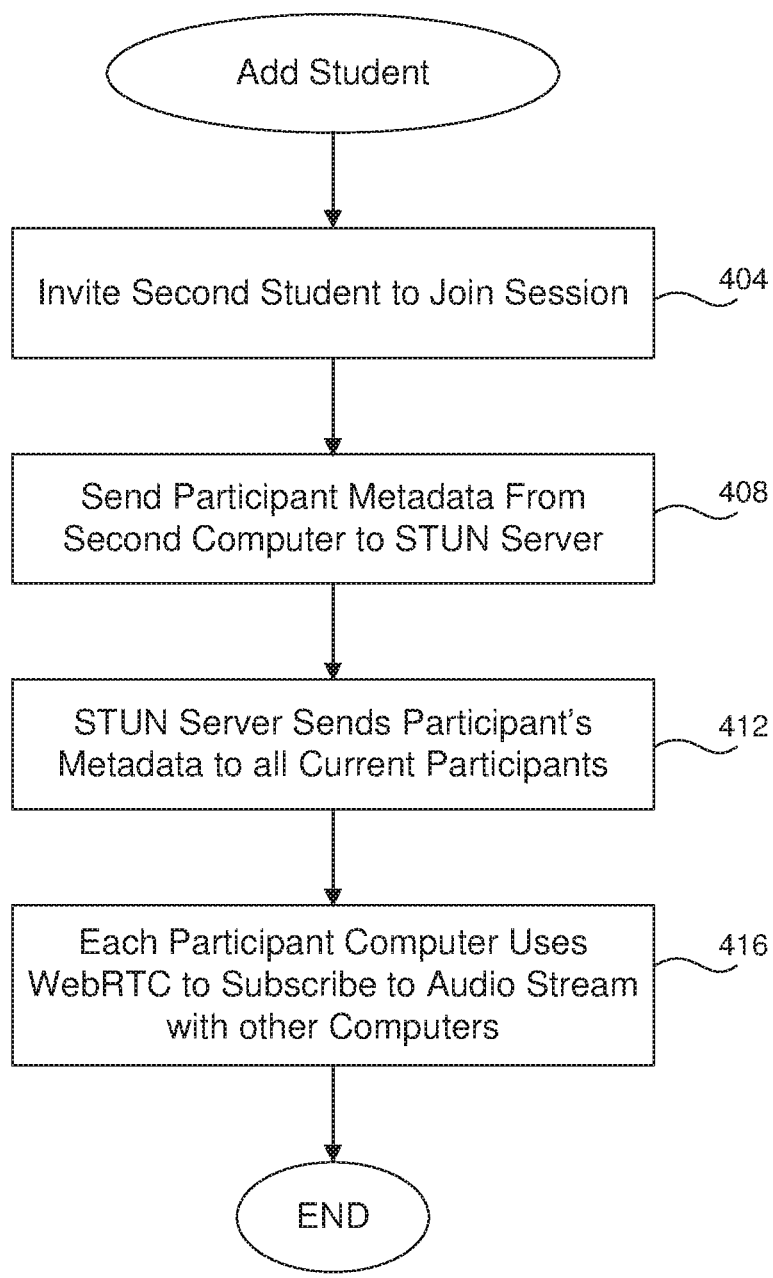
FIG. 10 is a flow diagram describing one embodiment by which a second participant is invited to join the session in which only the first student has joined.

FIG. 10 is a flow diagram describing one embodiment by which a second participant, in this case another student, is invited to join the session 350 in which only the first student has joined. It is also possible for a tutor to join second. In a first step 404 the second student is invited to join the session, for example, as has been described above such as by sending a link to the second student for the GoBoard application, by sending a link including the specific room identifier (e.g., link 351), sending an e-mail message or similar, etc. In fact, sending an explicit invitation is not necessary for any participant to join a particular session. Once in possession of the room identifier, the participants may have a standing agreement to join the session at a particular time on certain dates. When the second participant joins, he or she typically will follow the flow of FIG. 3, starting at step 204, and will choose option 302 in FIG. 4.

Once the second student has joined the session (or in conjunction with), in step 408 the participant metadata for the second student will be sent from the second student's computing device to the STUN server 150 as has been described above. This metadata may be sent at any time after the student's role has been determined. The GoBoard central server will ask the participant if he is a student or tutor. The student computer captures this information in its browser, and it can also be sent to the GoBoard central server. The role is stored on each student device and is relayed to all other devices via peer-to-peer communications. The role may be stored on the central GoBoard server, and then relayed to all new participants. But it is preferable to store on each student device and then distribute peer-to-peer.

As mentioned above, the participant metadata for the second student includes network parameters needed to establish video or audio streams with this computer, and the role of this participant, in this case, "student."

In a next step 412 the STUN server sends to all current participants in the current session all participant metadata for all of the current participants. In this example, the STUN server 150 has participant metadata for the two students currently in the session and will send this metadata to both student computers browsers. Although it is possible for the STUN server to only send the participant metadata regarding all other participants to a particular computer, [0001] in some cases it is more simple and efficient to send all participant metadata to all participants. Typically, a connection request from a new participant creates a push event to all currently connected participants, thus triggering the STUN server to send this participant metadata.

In a next step 416 the browser of each participant computer will use the received participant metadata to open video and audio streams (as applicable) with the computers of the other participants in this session. First, each participant computer determines whether or not the other participants are students or a tutor based upon the received participant metadata that lists the role of each participant. In order to reduce bandwidth, a student computer will not subscribe to a video stream from another student computer, only audio. All students and tutors responses regarding tutor or student are treated as correct. That response is stored on each user's device and then all other users "trust" that any information sent them via peer-to-peer is correct. Typically, code in the browser will make this determination. In this example, as both participants are students, each participant computer will use their own WebRTC library in order to subscribe to only an audio stream from the other computer; the audio is streamed directly between participant computers and is not pass through a central computer. Each computer may use a push or pull process to perform this subscription. These computers perform the subscription using a peer-to-peer communications platform and do not rely upon any central server for controlling this subscription and do not stream any audio/visual information through any central server. By only streaming audio directly between the two student computers, and by not streaming any video, bandwidth can be kept very low. Each participant computer uses the network parameters from the participant metadata in order to subscribe to an audio stream from the other computer.

The above has described how any number of students may join a group session; typically, no video will be streamed between students. Of course, it is also possible for a tutor to be the first one to join the session and then students will join later. One of skill in the art upon reading this disclosure will be able to implement that alternative.

Figure 11:
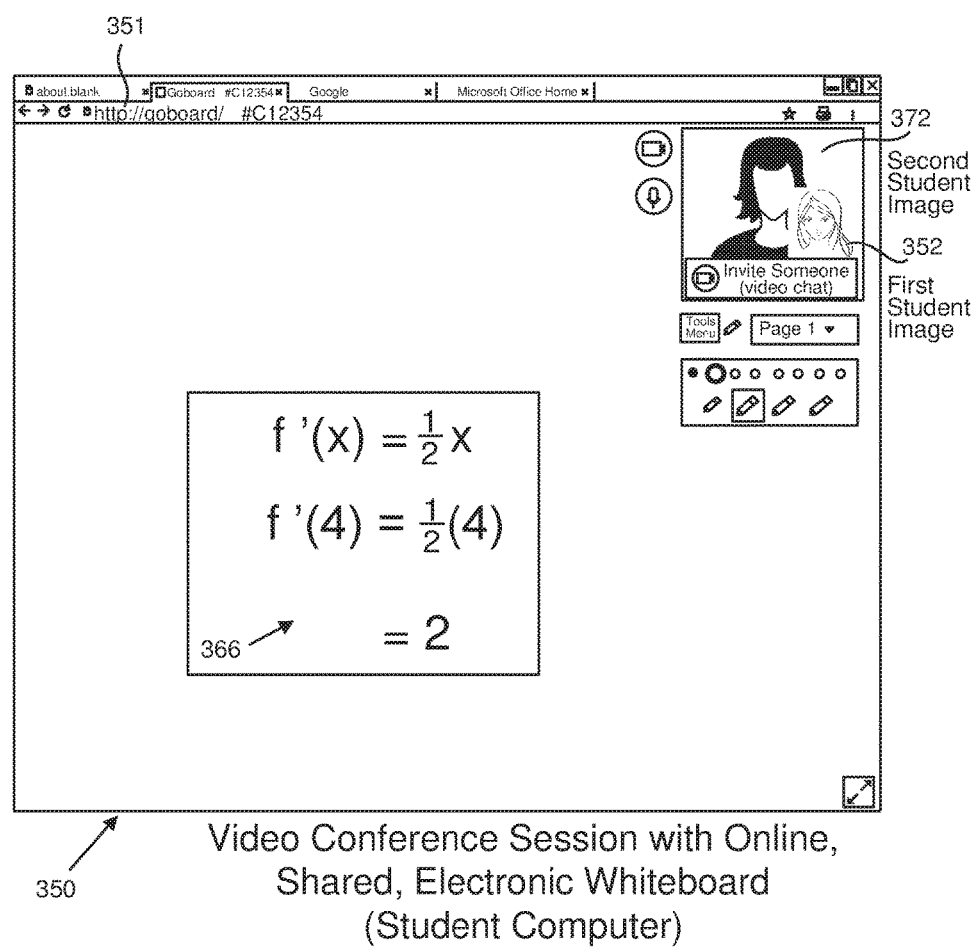
FIG. 11 is a screenshot showing group session after the second student has joined.

FIG. 11 is a screenshot showing group session 350 after the second student has joined. The session appears the same except that now a still image 372 of the second student appears on the display screen of the first student's computer and still image 352 of the first student is now smaller and shown as a picture-in-picture image. Of course, picture-in-picture is not necessary, both still images may be the same size (or may be different sizes) and it is not required that images be shown, although it is useful for a group session. There is no video image shown of the second student on the first student computer in order to reduce bandwidth. The display screen of the second student's computer will show a nearly similar session 350 except that still images 352 and 372 may be reversed. Any number of other students may join this group session and while they will be able to hear each other via the audio streams, no video streams are sent between these student computers.

Flow Diagram—Add Tutor

Figure 12:
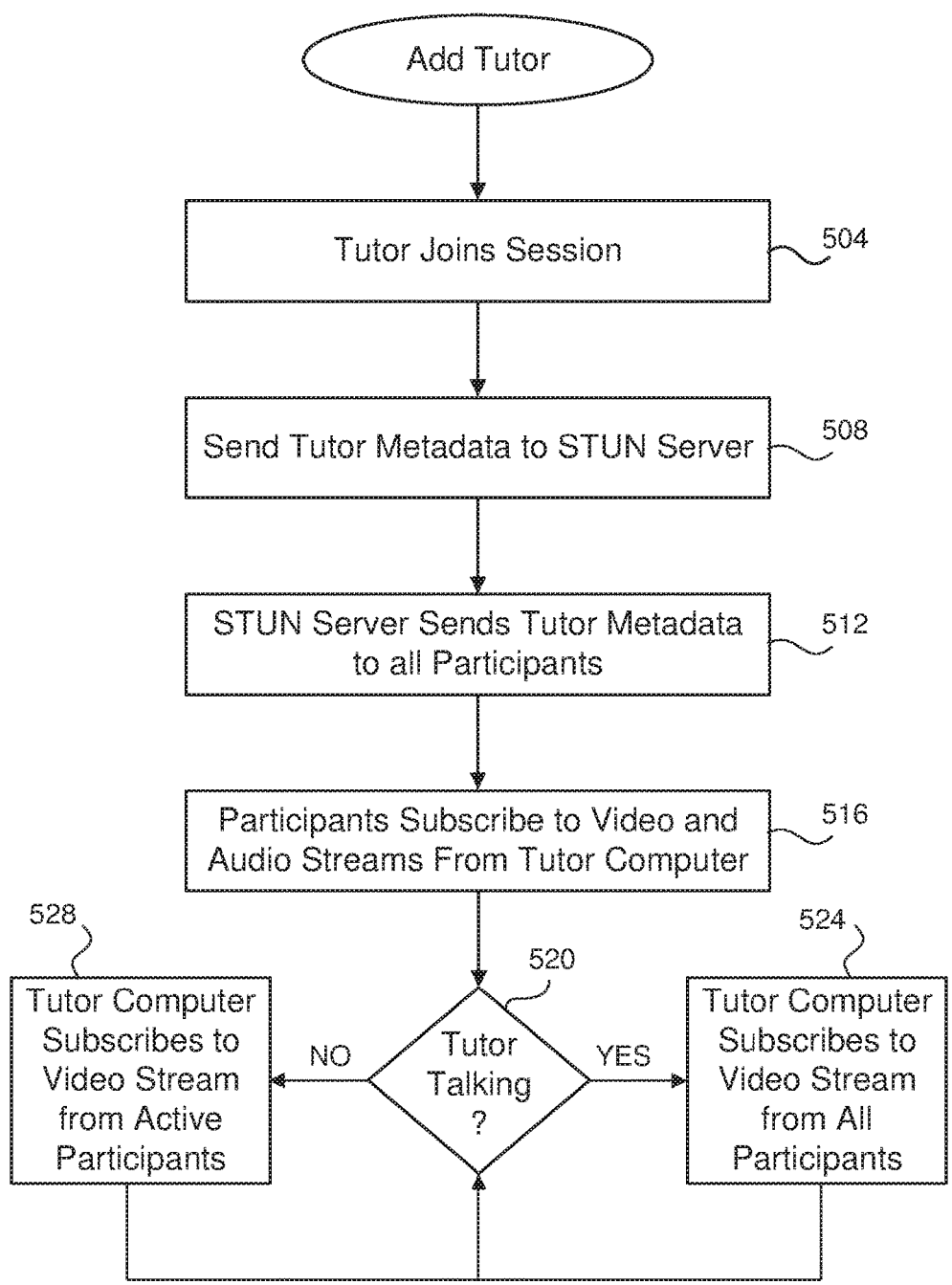
FIG. 12 is a flow diagram describing one embodiment in which a tutor joins group session in which other participants have already joined.

FIG. 12 is a flow diagram describing one embodiment in which a tutor joins group session 350 in which other participants have already joined.

In a first step 504 the tutor (or other instructor, teacher, or individual who will be designated as the session leader) joins the existing group session 350. It is also possible that the tutor is the first one to join the session (either using a room identifier for a session that had been used previously or by creating a new session). In this example though, two students have already joined the session. The tutor may join the session via an invitation as described above, may type in the room identifier for the session as shown in FIG. 4, or may enter a URL which takes him or her directly to session 350.

In a next step 508 the tutor computer sends the participant metadata (in this case, the tutor metadata) to the STUN server 150 in a similar manner as has been described earlier in step 408. In step 512 server 150 sends the tutor metadata to all participant computers and will also send the participant metadata of the two student computers to the tutor computer. In general, a student joining a session triggers sending participant metadata to all participants.

In a next step 516 all existing participants in the current group session subscribe to the video and audio streams from the tutor computer, preferably using a peer-to-peer communication platform such as WebRTC. This step enables all students to not only hear the tutor at all times but also to see the tutor speaking or interacting. Advantageously, the student computers only show a video stream from the tutor computer and not video streams from the other student computers. User computer browser software (typically loaded from the GoBoard central server) decides that since the tutor has the role of "tutor" that a student computer will subscribe to the tutor video stream.

In situations where the tutor computer has sufficient bandwidth, the tutor computer may subscribe to all video and audio streams from all student participants using the participant metadata it has received earlier. It may be desirable, though, to reduce the bandwidth used by the tutor's computer and a variety of tests may be used to limit the video streams that the tutor computer subscribes to. Accordingly, a test may be performed to determine how many video streams the tutor computer will subscribe to in order to view one or more students in real time. Any of a variety of tests, checks, or determinations may be made; in this example, step 520 determines whether the tutor is currently talking. This determination is made by detecting a change in the audio stream from the tutor computer.

For example, there is a speed test service downloaded in JavaScript from the central GoBoard server and run inside the browser. This downloads a file, sets a timer, and once the download of the file is completed, divides the file size by the length of time past to determine a speed. Then, a calculation is performed based on the speed determined, divided by a set number (perhaps 1 Mbps as a denominator for how much an individual video stream "costs" in term of bandwidth) to determine how many subscriptions can be opened. Thus, software on the tutor computer can make a determination as to how many streams can be opened.

If the tutor is currently talking then in step 524 the tutor computer (via WebRTC) will subscribe to all video streams from all student participants thus enabling the tutor to see all students in real time. This step is advantageous as the tutor can then see the reactions of all students as he or she is talking.

If the tutor is not talking, then in step 528 the tutor computer only subscribes to the video stream or streams from the currently active participant or participants. For example, if only a single student is speaking the tutor computer detects a change in the audio stream from this student computer, makes that student the active student, and will only subscribe to the video stream from that student.

If two students are having a conversation, the tutor computer detects changes in those two audio streams, makes those two students the active students, and will only subscribe to those video streams from those two students. In this manner, the tutor will only view the video stream from the student or students that are speaking and will be able to focus on those students.

As shown in steps 524 and 528, control from each of the steps returns to decision 520 such that the tutor computer checks periodically if the tutor is still talking. If the tutor is talking and is viewing video streams of all students, but then stops talking and a single student starts speaking, then control moves to step 528. Conversely, if a single student is speaking but then stops speaking, and then the tutor begins speaking, then control moves to step 524.

This test may be performed constantly and is shared amongst the participants. So if there are five participants, we can alternate every second which computer is performing the test, and when the subscription changes, one user's computer notifies all other subscribed computers to change the stream. This saves a significant amount of computing power as we are able to distribute the "cost" in terms of computing power and bandwidth of running the test.

A default setting may be used to delay switching subscriptions (e.g., from step 524 to step 528) when either step 524 or 528 is being implemented. For instance, if a tutor is talking in step 524 but then stops talking, the tutor computer will continue to subscribe to video streams from all students unless one of the students begins speaking and control then moves to step 528. Similarly, if two students are speaking in step 528 and the tutor computer subscribes to both of those video streams, but then both students stop talking, the tutor computer will continued to subscribe to both of the streams until the tutor begins speaking again.

Various techniques may be used to handle switching subscriptions, participants speaking at the same time, rapid questions and answers, etc. For example, subscriptions for video will only switch back and forth after sustained action over X period of time—such as a minimum of 5 seconds. And, audio is always heard by all participants at all times unless it is muted. If both the student and tutor are speaking at same time, it will default to the one who was speaking first for at least 5 seconds in an un-interrupted fashion.

Other tests may also be performed in step 520. For example, even if the tutor is not talking, but he or she is writing on a board or sheet, gesticulating, pointing, etc., this indicates that the tutor is likely teaching something and would like to view all of the video streams from all students. In this situation, control moves to step 524, if not, control moves to step 528 so that the tutor computer can subscribe to whichever student is the active student. Detecting whether or not a tutor is moving enough to suggest that he or she is teaching may be performed by checking the action log in the shared canvas space in the current room. If enough actions are performed in a specific period of time (drawing lines, talking, creating shapes, using the laser pointer, writing text), we understand that the user is currently active.

Figure 13:
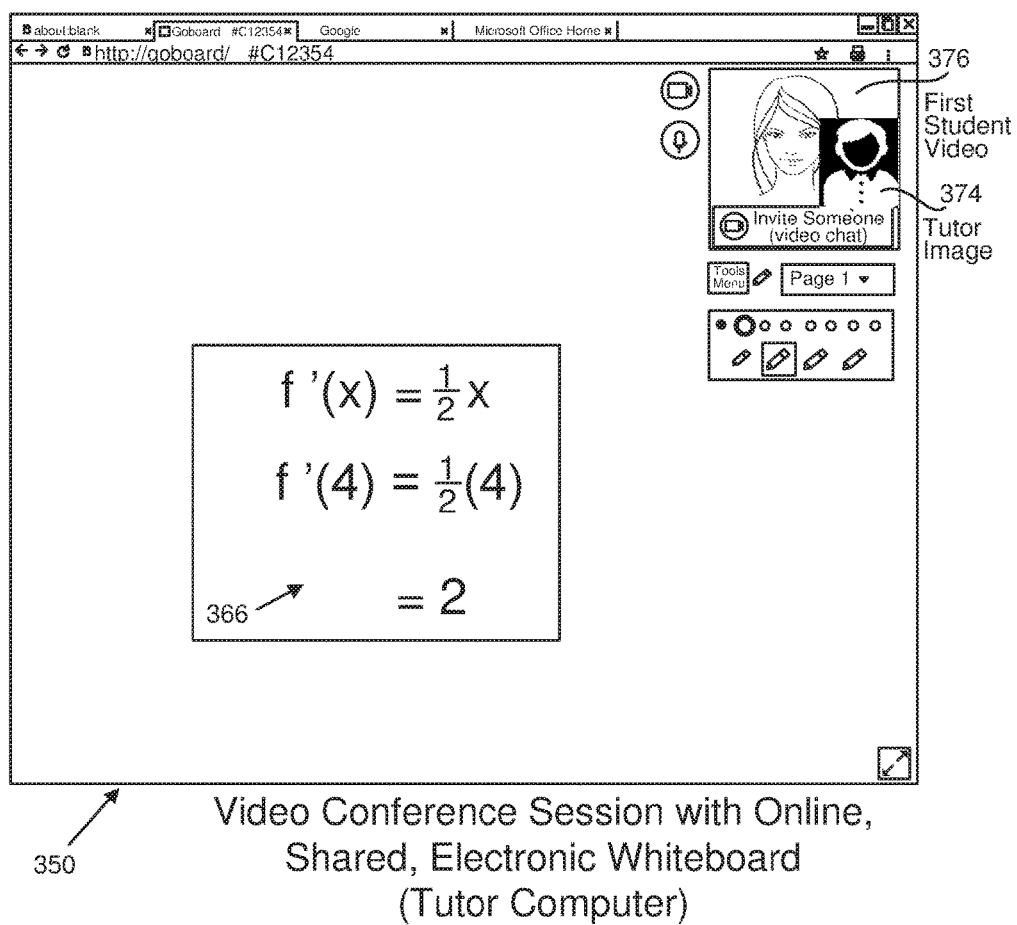
FIG. 13 is a screenshot showing group session after the tutor has joined and one student is talking.

FIG. 13 is a screenshot showing group session 350 after the tutor has joined and one student is talking. The session appears the same except that now a video image 376 of the first student appears on the display screen of the tutor's computer and a still image 374 of the tutor appears as a picture-in-picture image. Picture-in-picture is not necessary and it is not required that an image of the tutor be shown. There is no video image shown of the other students shown on the tutor computer in order to reduce bandwidth. It is possible to show the still images of other students, although these are not shown in this example. Further, any number of other students may also be talking, the tutor computer may subscribe to these video streams, and each of their video streams may also be shown on the tutor computer, although typically it will simply be two students having a conversation.

Figure 14:
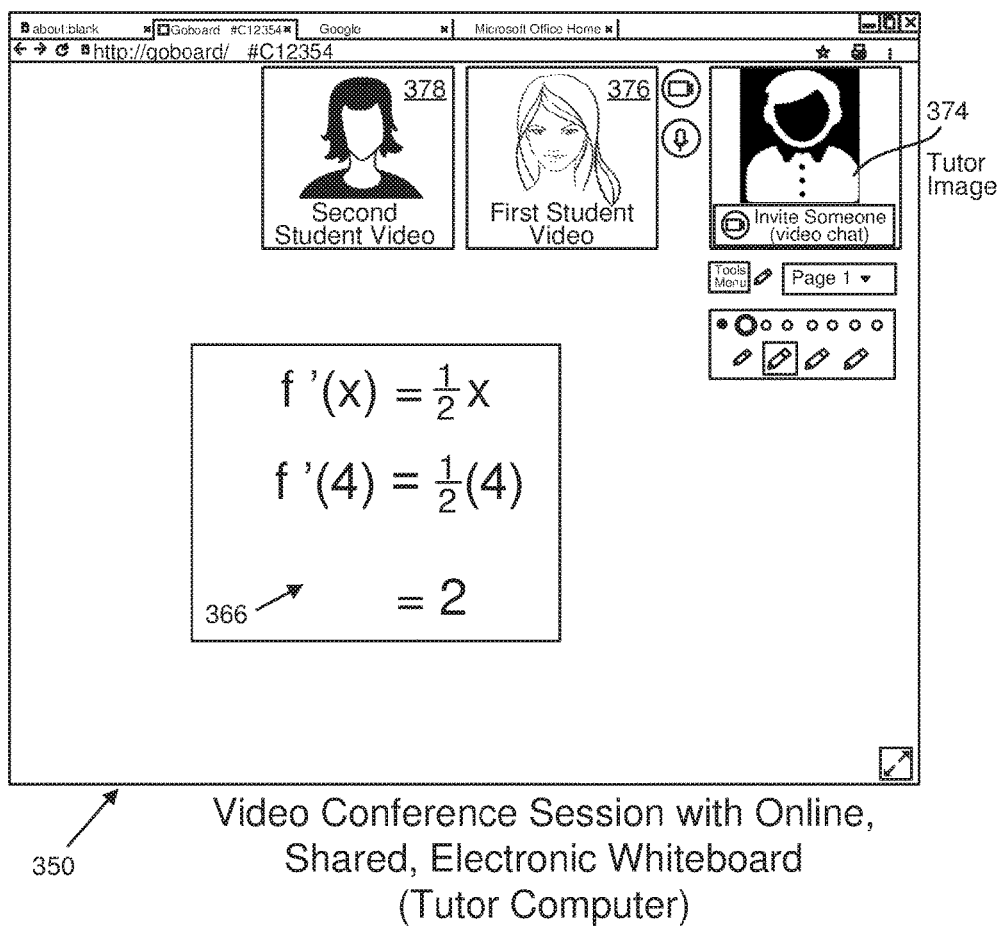
FIG. 14 is a screenshot showing group session after the tutor has joined, no student is talking, but the tutor is talking.

FIG. 14 is a screenshot showing group session 350 after the tutor has joined, no student is talking, but the tutor is talking. The session appears the same except that now video images 376 and 378 of both students appear on the display screen of the tutor's computer and a still image 374 of the tutor appears. It is not required that an image of the tutor be shown. Any number of other students may also be in the session and each of their video streams will also be shown on the tutor computer as described in the implementation of step 524.

Figure 15:
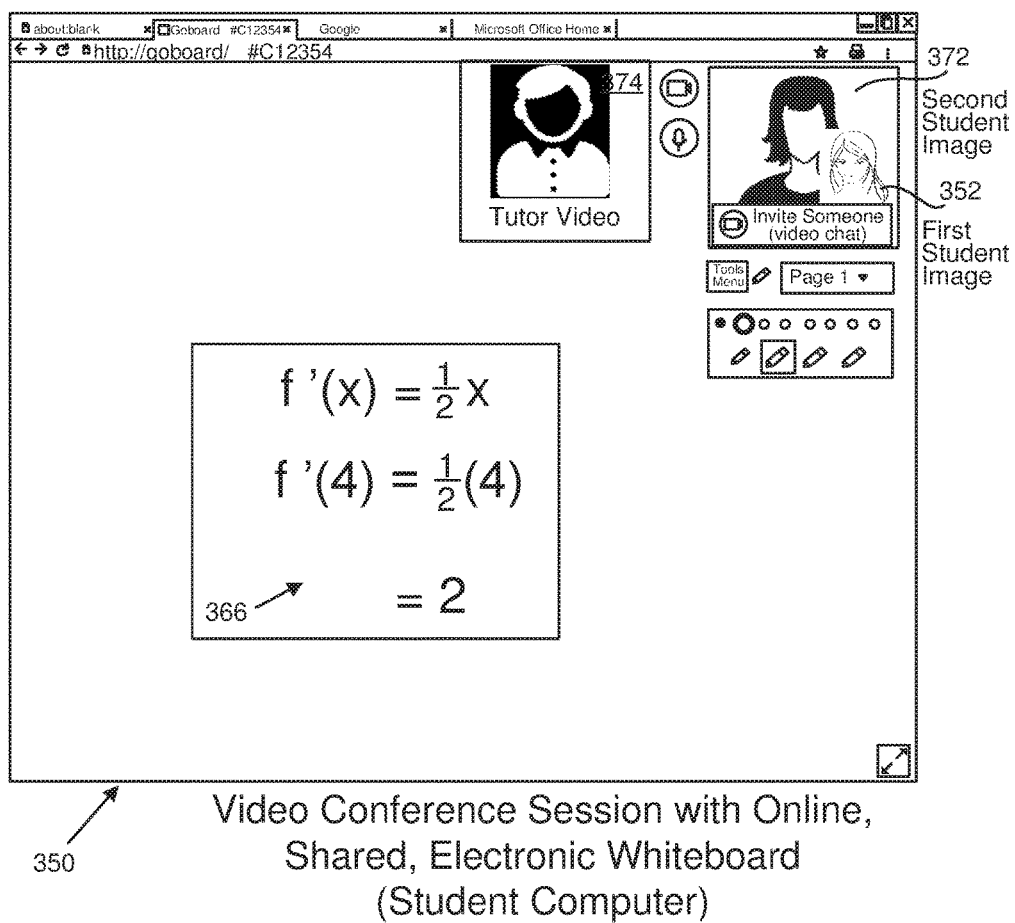
FIG. 15 is a screenshot showing group session on the first student computer after the tutor has joined.

FIG. 15 is a screenshot showing group session 350 on the first student computer after the tutor has joined. The session appears the same except that now video image 374 of the tutor appears on the display screen of the student's computer and a still image 352 of the student appears. A still image 372 of the second student also appears. It is not required that an image of the first student be shown. Any number of other students may also be in the session and each of their still images will also be shown on the student computer. Note that only the tutor has a live video image as the first student computer has not subscribed to the video streams of the other student computers, thus reducing bandwidth on the student computer.

Flow Diagram—Automatic Addition of Video Stream

In an additional embodiment of the invention, a particular student may be allowed to view the video stream of another student or students, as long as the upload speed of the other student's connection is sufficient and as long as the download speed of the particular student's connection is sufficient. Also, for each given increase in upload speed a student may be allowed to share their video stream with another student, and for each given increase in download speed a student may be allowed to subscribe to another student's video stream.

Figure 16:
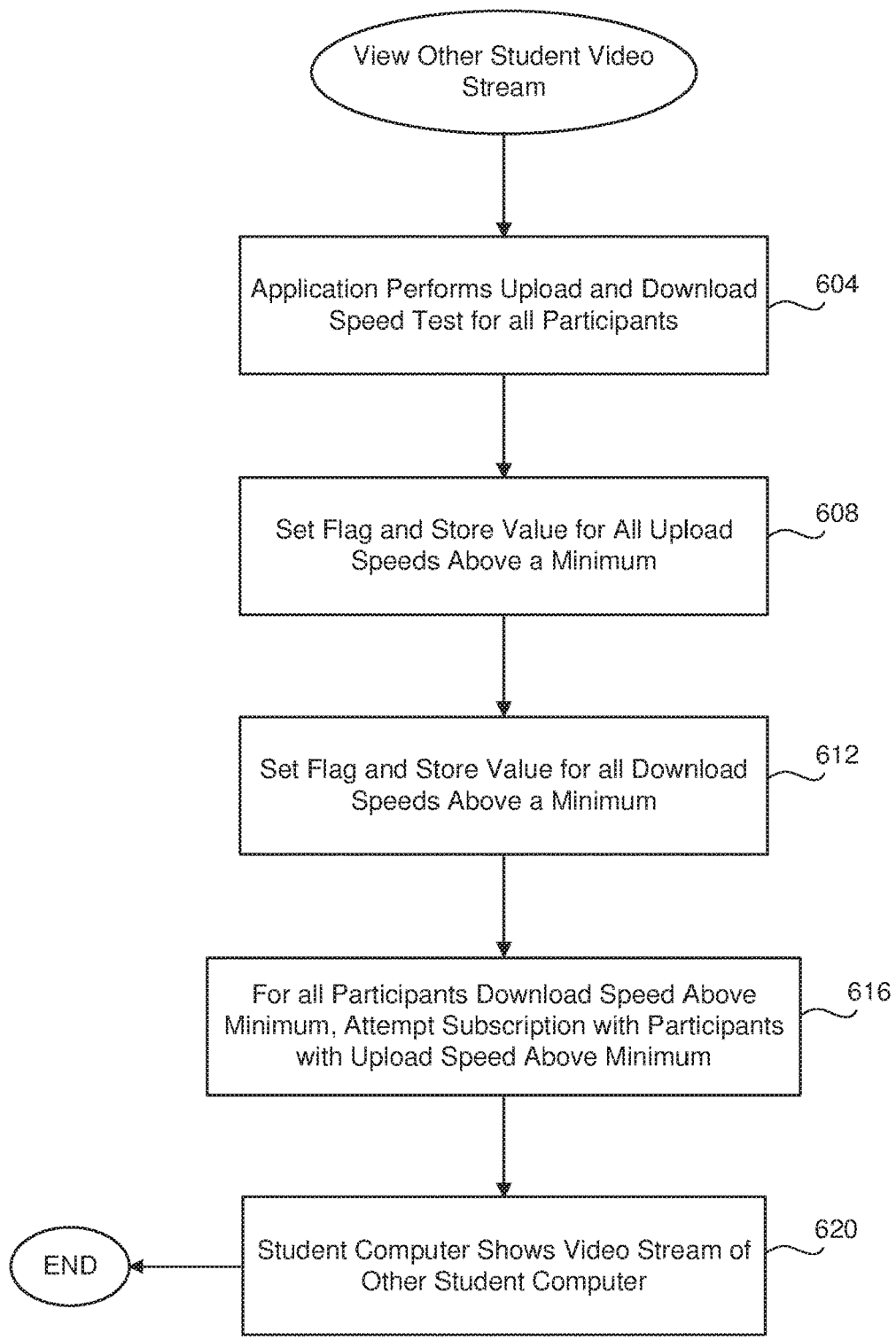
FIG. 16 is a flow diagram describing one embodiment by which student computers are automatically tested and students may be allowed to view video streams from other students.

FIG. 16 is a flow diagram describing one embodiment by which student computers are automatically tested and students may be allowed to view video streams from other students. In a first step 604 application 101 on the server computer 20 automatically performs an upload speed test and a download speed test for all participant computers whose role is that of "student." These tests may be performed as soon a student has opened the application in step 204, once a student has logged in, or once the student has entered a session. Preferably, the tests are performed after the participant metadata has been uploaded to the STUN server 150 as results from the speed tests will be stored with that metadata. Techniques for performing upload and download speed tests of a computer from a remote server computer are known; the results are typically a value in megabytes per second for upload speed and for download speed. Server 150 is arranged to perform these tests on all student computers.

In step 608, for all student computers, server 150 will both set a flag (e.g., "available for upload") and store the upload speed value in the participant metadata for each student computer whose upload speed is above a certain minimum Depending upon design choices, this minimum may be chosen to ensure that a student computer is able to upload at least one other video stream (other than that for the tutor computer) for delivery to another student computer, or, may be chosen to ensure that a student computer is able to upload a given number of video streams to a likely number of students in a group session (e.g., four video streams, as typically there may be a total of five students in a session).

A suitable minimum to ensure that at least one other video stream may be uploaded is approximately 3 Mbps. In addition to the flag, application 101 will also store the actual upload speed for each student computer in order to facilitate uploading additional video streams from other student computers. For example, for each 5 Mbps above the minimum upload speed, the student computer may be allowed to send a video stream to another student computer.

In step 612, for all student computers, server 150 will both set a flag (e.g., "available for download") and store the download speed value in the participant metadata for each student computer whose download speed is above a certain minimum. Depending upon design choices, this minimum may be chosen to ensure that a student computer is able to download at least one other video stream (other than that from the tutor computer) from another student computer, or, may be chosen to ensure that a student computer is able to download a given number of video streams from a likely number of students in a group session (e.g., four video streams, as typically there will be a total of five students in a session).

A suitable minimum to ensure that at least one other video stream may be downloaded is approximately 3 Mbps. In addition to the flag, application 101 will also store the actual download speed for each student computer in order to facilitate downloading additional video streams from the other student computers. For example, each 5 Mbps per second above the minimum download speed, the student computer may be allowed to download another video stream from another student's computer.

Table 1 shows example data in Mbps from speed tests performed on three student computers, the data being stored in a table, for example, in memory used by application 101. Of course, the data may be stored in other forms, and typically each computer's data will be stored along with the other participant metadata for that computer. In this example, a minimum of 5 Mbps is needed by each student computer in order not only to download and view the tutor video stream but also to upload a student video stream to the tutor computer. And, for each 5 Mbps above the minimum, a student computer will be allowed to upload or download an additional video stream. Accordingly, the first student computer is not available to upload or download additional video streams because its speeds are at the minimum needed for streaming between the tutor computer. By contrast, the second student computer is available for both uploading and downloading additional student video streams. Assuming that the minimum increment is 5 Mbps in order to handle an additional stream, this computer can upload one video stream to another student computer and is available to download two video streams from two other student computers. The third student computer is not available to upload an additional video stream to another student computer because its upload speed is at the minimum, but it will be allowed to download an additional video stream from another student computer.

TABLE 1

Speed Tests Performed on Student Computers

| Computer | Available Upload? | Available Download? | Upload Speed | Download Speed |
| --- | --- | --- | --- | --- |
| First student computer | No. | No. | 5 | 5 |
| Second student computer | Yes. | Yes. | 10 | 15 |
| Third student computer | No. | Yes. | 5 | 10 |

While the above describes one embodiment for iterating through all student computers and first setting flags and storing values before proceeding to the below steps, it is also possible to perform the decisions of step 616 as upload speeds and download speeds are being determined. For example, after determining upload speeds, as each download speed is determined for a particular student computer, a decision may be made on-the-fly whether or not to subscribe that particular user computer to the video stream from one of the computers having an acceptable upload speed. Other variations on these steps are also possible.

In one specific embodiment, in step 616 application 101 iterates through each of the student computers having any flag set (indicating adequate upload or download speed) and attempts to subscribe those of the student computers having adequate download speed to those computers having adequate upload speed. Considering two computers one having adequate upload speed for one additional video stream and the other having adequate download speed for one additional video stream, then when one subscribes to the other then both of those computers will not be eligible to download another video stream or upload another video stream as the case may be. If the set flag means enough upload speed and enough download speed for a typical number of students, then step 616 will attempt to match as many student computers having upload flags set with those computers having download flags set. For example, a set flag may mean that a given computer has enough upload or download speed to accommodate four additional video streams. One of skill in the art will be able to make design choices to choose appropriate values and meanings for the upload and download flags. Whether to begin subscriptions with the first, second or other student computer is a design choice that may be made by one of skill in the art.

Preferably, every computer will run the speed test locally using code downloaded from the GoBoard central server to its browser. Based on the bandwidth information gleaned from this exercise, each user computer will communicate directly with the other user computers to determine how many streams to open. The STUN server is only used to negotiate actual network connections; once those connections are negotiated, each user computer communicates directly with the other computers to determine which streams to open, and then opens those streams directly between the user computers.

In step 620 at least one student computer is allowed to upload a video stream to another student computer (which has subscribed to that stream) based upon the decisions of step 616. Accordingly, at least one student computer subscribes to and shows a video stream from another student computer in addition to the video stream from the tutor computer.

Figure 17:
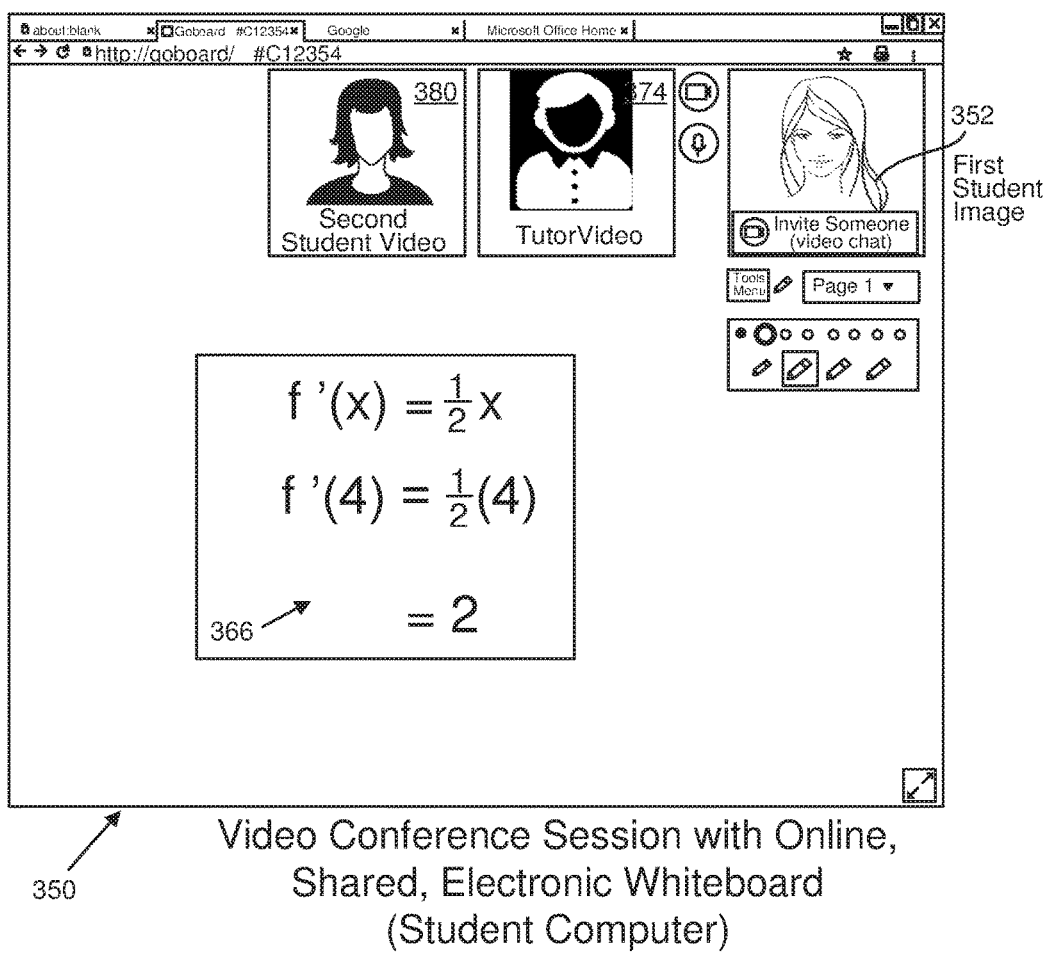
FIG. 17 is a screenshot showing group session on the first student computer including both tutor and second student video streams.

FIG. 17 is a screenshot showing group session 350 on the first student computer including both tutor and second student video streams. The session appears the same except that in addition to video image 374 of the tutor, video image 380 of the second student also appears based upon the decision of step 616. A still image 352 of the first student still appears, although it is not required that an image of the first student be shown. Any number of other students may also be in the session and typically each of their still images will also be shown on the student computer, unless step 616 determines that the first student computer may subscribe to other student video streams, in which case other student video streams will also appear.

Figure 18:
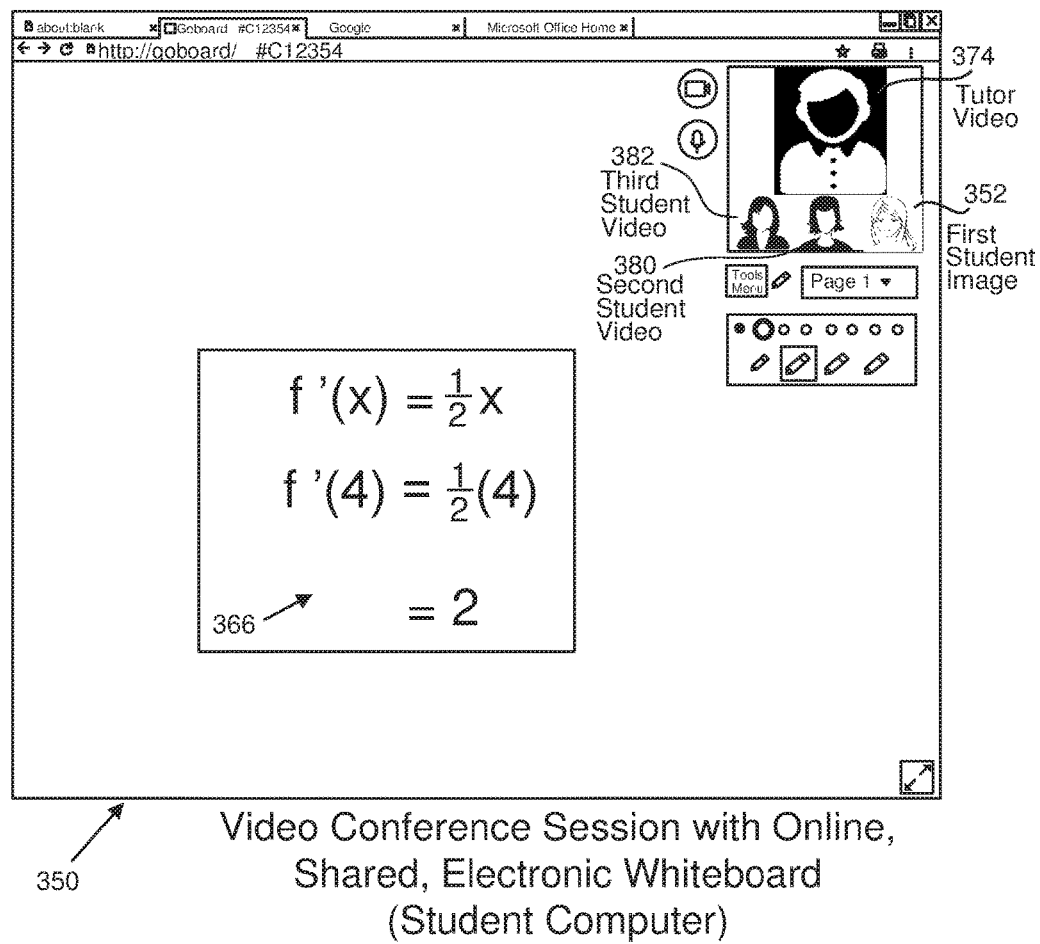
FIG. 18 is a screenshot showing group session on the first student computer using a different embodiment for video placement.

FIG. 18 is a screenshot showing group session 350 on the first student computer using a different embodiment for video placement. In this example, step 616 has determined that in addition to showing tutor video 374, a second student computer and a third student computer each have enough upload speed to upload a video stream to the first student computer, and, that the first student computer has enough download speed to download these additional two video streams. Accordingly, a second student video stream 380 and a third student video stream 382 are displayed on the first student computer. In this embodiment, the first student image and the additional two video streams are all shown as picture-in-picture, i.e., within the video stream of the tutor 374. Of course, display of still images or video streams on a participant's computer may occur in different locations on the screen, may be of different sizes, may be picture-in-picture, may appear separately, etc.

Computer and Mobile Device Embodiments

Figure 19:
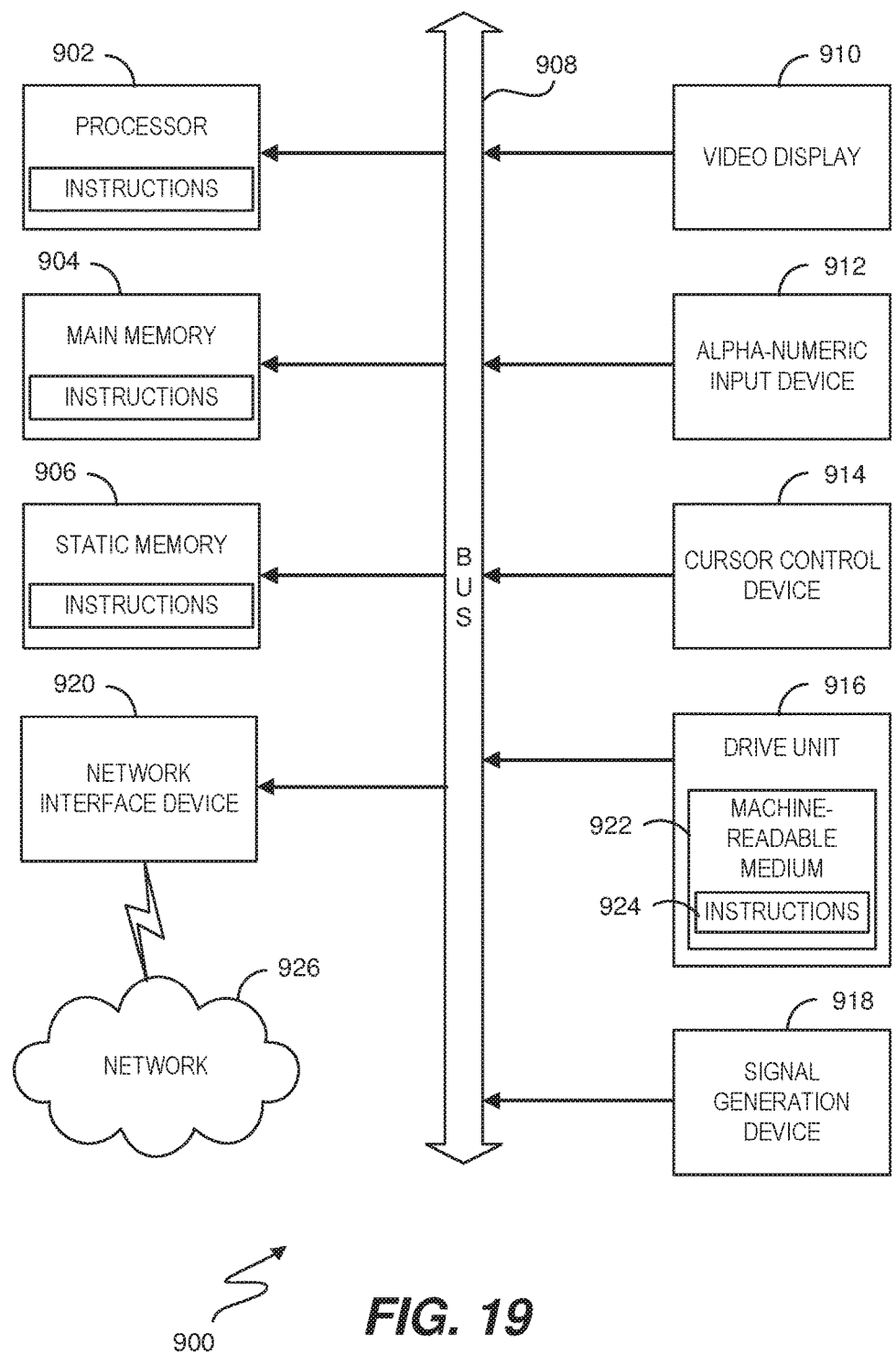
FIG. 19 is a block diagram of a computer system suitable for implementing embodiments of the present invention.

FIG. 19 is a block diagram of a user computer 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer 900 includes a processor 902 (e.g., a central processing unit (CPU), a graphics processing unit (GPU) or both), a main memory 904 and a static memory 906, which communicate with each other via a bus 908. The computer 900 may further include a video display unit 910 (e.g., a liquid crystal display (LCD) or a cathode ray tube (CRT)). The computer 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer 900, the main memory 904 and the processor 902 also constituting machine-readable media.

The software 924 may further be transmitted or received over a network 926 via the network interface device 920 utilizing any one of a number of well-known transfer protocols (e. g., HTTP).

Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

While the machine-readable medium 922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and annotations/drawings are to be regarded in an illustrative rather than a restrictive sense.

According to various embodiments, computer 900 may include a variety of components, modules and/or systems for providing various types of functionality. For example, in at least one embodiment, computer 900 may include a Web browser application which is operable to process, execute, and/or support the use of scripts (e.g., JavaScript, AJAX, etc.), Plug-ins, executable code, virtual machines, HTML5 vector-based web animation (e.g., Adobe Flash), etc. The Web browser application may be configured to instantiate components and/or objects at the computer in response to processing scripts, instructions, and/or other information received from a remote server such as a Web server.

Figure 20:
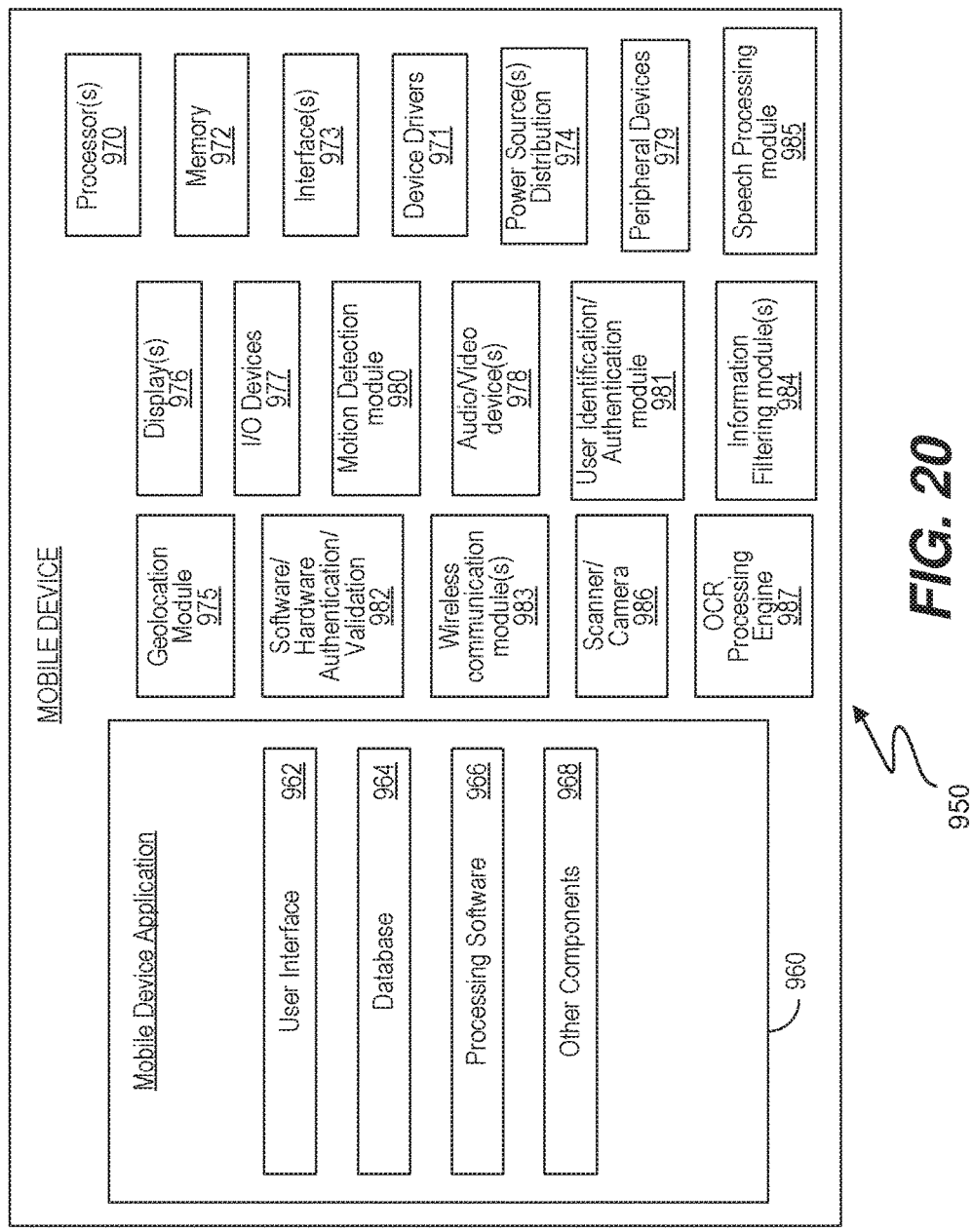
FIG. 20 is a block diagram of a mobile device suitable for implementing embodiments of the present invention.

FIG. 20 is a simplified block diagram of an example mobile device 950. Mobile device 950 may include mobile device application 960 which includes a user interface 962, a database 964, processing software 966, and other components 968 for enabling the mobile device to perform various types of functions such as those described herein.

Various functionalities of the mobile device may be performed by one or more of the following components:

processor(s) 970; device drivers 971; memory 972; interface(s) 973; power source(s)/distribution 974; geolocation module 975; display(s) 976; I/O devices 977; audio/video devices(s) 978; peripheral devices 979; motion detection module 980; user identification/authentication module 981; software/hardware authentication/validation 982; wireless communication module(s) 983; information filtering module(s) 984; speech processing module 985; scanner/camera 986; and OCR processing engine 987.

Memory 972 may include volatile memory (e.g., RAM) as well as non-volatile memory (e.g., persistent storage, disk memory, FLASH memory, EPROMs, unalterable memory etc.) implemented on a machine-readable medium. Interface(s) 306 may include wired interfaces or wireless interfaces. The wireless communication interfaces may be configured or designed to communicate with computers, remote servers, other wireless devices. Such wireless communication may be implemented using one or more wireless interfaces/protocols such as, for example, 802.11 (WiFi), 802.15 (including Bluetooth™) 802.16 (WiMax), 802.22, Cellular standards such as CDMA, CDMA2000, WCDMA, Radio Frequency (e.g., RFID), Infrared, Near Field Magnetics, etc. Geolocation module 975 acquires geolocation information from remote sources and uses the acquired geolocation information to determine information relating to a relative or absolute position of the mobile device.

Motion detection component 980 detects motion or movement of the mobile device and detects motion, movement, gestures or other input data from user. The motion detection component 980 may include one or more motion detection sensors such as MEMS (Micro Electro Mechanical System) accelerometers that can detect the acceleration or other movements of the mobile device as it is moved by a user. I/O Device(s) 977 include keys, buttons, scroll wheels, cursors, touchscreen sensors, audio command interfaces, a magnetic strip reader, an optical scanner, etc. Audio/video device(s) 978 include cameras, speakers, microphones, wireless transmitter/receiver devices for enabling wireless audio and/or visual communication between the mobile device and remote devices (e.g., radios, telephones, computer systems, etc.). Peripheral devices 979 include memory card readers, fingerprint readers, image projection devices, etc. Wireless communication module 983 may be configured to communicate with external devices using one or more wireless interfaces/protocols such as, for example, 802.11 (WiFi), 802.15 (including Bluetooth™) 802.16 (WiMax), 802.22, Cellular standards such as CDMA, CDMA2000, WCDMA, Radio Frequency (e.g., RFID), Infrared, Near Field Magnetics, etc. Scanner/Camera 986 may be use in scanning identifiers or other content from other devices or objects such as mobile device displays, computer displays, static displays (e.g., printed on tangible mediums), etc. OCR Processing Engine 987 is operable to perform image processing and optical character recognition of images such as those captured by a mobile device camera, for example. Speech processing module 985 performs speech recognition, speech-to-text conversion, etc.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of reducing bandwidth used by computers participating in a session of a video conference, said method comprising:
   receiving at a central server requests from first, second and third computers to join a session of a video conference, each of said requests including a role of each of said computers and streaming information for each of said computers;
   sending, from said central server to each of said computers said role and said streaming information from others of said computers;
   subscribing, by said third computer, directly to a video stream from each of said first and second computers, and streaming said first and second video streams directly for display upon said third computer using said streaming information of said first and second computers;
   subscribing, by said first and second computers, directly to a video stream from said third computer based upon said role of said third computer, and streaming said third video stream directly for display upon each of said first and second computers using said streaming information of said third computer; and
   not subscribing said first computer to a video stream from said second computer based upon said role of said second computer determined by said first computer, and not subscribing said second computer to a video stream from said first computer based upon said role of said first computer determined by said second computer, wherein video is not streamed between said first and second computers.

2. A method as recited in claim 1 wherein said subscribing and said streaming by said first, second and third computers uses a peer-to-peer communications platform.

3. A method as recited in claim 1 wherein said streaming of said first, second and third video streams is not routed through said central server.

4. A method as recited in claim 1 wherein said third computer subscribes to said video streams from said first and second computers based upon said roles of said first and second computers being "student."

5. A method as recited in claim 1 wherein said first and second computers subscribe to said video stream from said third computer based upon said role of said third computer being "session leader."

6. A method as recited in claim 1 further comprising:
   subscribing, by said first computer, directly to a video stream from said second computer when it is determined that an upload speed of said second computer is above an upload threshold value and when it is determined that a download speed of said first computer is above a download threshold value; and
   streaming a fourth video stream directly for display upon said first computer from said second computer using said streaming information of said second computer.

7. A method as recited in claim 1 further comprising:
   receiving input from a plurality of users at said first, second and third computers indicating said each role of said first, second and third computers.

8. A method as recited in claim 1 further comprising:
   receiving said each role of said first, second and third computers from a database based upon a login from said first, second and third computers.

9. A method as recited in claim 1 further comprising:
   receiving said each role of said first, second and third computers from a trusted system.

10. A method of reducing bandwidth used by computers participating in a session of a video conference, said method comprising:

receiving at a central server a request from a first computer to join a session of a video conference along with a role of said first computer and streaming information of said first computer, said session including second and third computers;

sending from said central server to each of said second and third computers, said role and said streaming information from said first computer;

sending from said central server to said first computer, a role and streaming information of each of said second and third computers;

subscribing, by said third computer, directly to a first video stream from said first computer, and streaming said first video stream directly for display upon said third computer using said streaming information of said first computer;

subscribing, by said first computer, directly to a third video stream from said third computer based upon said role of said third computer, and streaming said third video stream directly for display upon said first computer using said streaming information of said third computer; and not subscribing said first computer to a video stream from said second computer based upon said role of said second computer determined by said first computer, and not subscribing said second computer to a video stream from said first computer based upon said role of said first computer determined by said second computer, wherein video is not streamed between said first and second computers.

11. A method as recited in claim 10 wherein said subscribing and said streaming by said first, second and third computers uses a peer-to-peer communications platform.

12. A method as recited in claim 10 wherein said streaming of said first, second and third video streams is not routed through said central server.

13. A method as recited in claim 10 wherein said third computer subscribes to said video stream from said first computer based upon said role of said first computer being "student."

14. A method as recited in claim 10 wherein said first computer subscribes to said video stream from said third computer based upon said role of said third computer being "session leader."

15. A method as recited in claim 10 further comprising:

subscribing, by said first computer, directly to a video stream from said second computer when it is determined that an upload speed of said second computer is above an upload threshold value and when it is determined that a download speed of said first computer is above a download threshold value; and streaming a fourth video stream directly for display upon said first computer from said second computer using said streaming information of said second computer.

16. A method of reducing bandwidth used by computers participating in a session of a video conference, said method comprising:

receiving at a central server requests from first, second and third computers to join a session of a video conference, each of said requests including a role of each of said computers and streaming information for each of said computers;

sending, from said central server to each of said computers said role and said streaming information from others of said computers;

subscribing, by said third computer, directly to a video stream from each of said first and second computers, and streaming said first and second video streams directly for display upon said third computer using said streaming information only when it is determined that an audio stream from said third computer indicates that a person is talking;

subscribing, by said first and second computers, directly to a video stream from said third computer based upon said role of said third computer, and streaming said third video stream directly for display upon each of said first and second computers using said streaming information; and not subscribing said first computer to a video stream from said second computer based upon said role of said second computer determined by said first computer, and not subscribing said second computer to a video stream from said first computer based upon said role of said first computer determined by said second computer, wherein video is not streamed between said first and second computers.

17. A method as recited in claim 16, said method further comprising:

subscribing, by said third computer, directly to a video stream from said first computer, and streaming said first video stream directly for display upon said third computer using said streaming information only when it is determined that an audio stream from said first computer indicates that a person is talking.

18. A method as recited in claim 16 wherein said subscribing and said streaming by said first, second and third computers uses a peer-to-peer communications platform.

19. A method as recited in claim 16 wherein said streaming of said first, second and third video streams is not routed through said central server.

20. A method as recited in claim 16 wherein said third computer subscribes to said video streams from said first and second computers based upon said roles of said first and second computers being "student."

21. A method as recited in claim 16 wherein said first and second computers subscribe to said video stream from said third computer based upon said role of said third computer being "session leader."

22. A method as recited in claim 16 further comprising:

subscribing, by said first computer, directly to a video stream from said second computer when it is determined that an upload speed of said second computer is above an upload threshold value and when it is determined that a download speed of said first computer is above a download threshold value; and streaming a fourth video stream directly for display upon said first computer from said second computer using said streaming information of said second computer.

23. A method as recited in claim 16 further comprising:

subscribing, by said third computer, directly to a video stream from each of said first and second computers, and streaming said first and second video streams directly for display upon said third computer using said streaming information when it is determined that an audio stream from said third computer indicates that a person is talking or when it is determined that a minimum number of actions are performed in a period of time by said third computer upon a shared whiteboard.

24. A method of reducing bandwidth used by computers participating in a session of a video conference, said method comprising:
  receiving at a central server requests from first, second and third computers to join a session of a video conference, each of said requests including a role of each of said computers and streaming information for each of said computers;
  sending, from said central server to each of said computers said role, said streaming information from others of said computers, and computer code to perform an upload or download bandwidth speed test;
  performing said upload and said download bandwidth speed test by each of said second and third computers using said computer code;
  subscribing, by said second computer, directly to a video stream from said third computer only when it is determined that an upload speed of said third computer is above an upload threshold value and when it is determined that a download speed of said second computer is above a download threshold value; and
  streaming a video stream directly for display upon said second computer from said third computer using said streaming information of said third computer.

25. A method as recited in claim 24 wherein said streaming is not routed through said central server.

26. A method as recited in claim 24 wherein said first computer subscribes to said video streams from said second and third computers based upon said roles of said second and third computers being "student."

27. A method as recited in claim 24 wherein said second and third computers subscribe to said video stream from said first computer based upon said role of said first computer being "session leader."

28. A method as recited in claim 24 further comprising:
  receiving input from a plurality of users at said first, second and third computers indicating said each role of said first, second and third computers.

29. A method as recited in claim 24 further comprising:
  receiving said each role of said first, second and third computers from a database based upon a login from said first, second and third computers.

30. A method as recited in claim 24 further comprising:
  receiving said each role of said first, second and third computers from a trusted system.

* * * * *